US006955793B1

(12) United States Patent
Arencibia, Jr.

(10) Patent No.: US 6,955,793 B1
(45) Date of Patent: Oct. 18, 2005

(54) TEMPERATURE CONTROLLED REACTION VESSEL

(76) Inventor: José P. Arencibia, Jr., P.O. Box 401, Center Valley, PA (US) 18034

( * ) Notice: Subject to any disclaimer, the term of this patent is extended or adjusted under 35 U.S.C. 154(b) by 0 days.

(21) Appl. No.: 09/548,511

(22) Filed: Apr. 13, 2000

Related U.S. Application Data

(63) Continuation-in-part of application No. 08/878,372, filed on Jun. 18, 1997, now abandoned.

(51) Int. Cl.[7] ............................. F28D 5/00; F28D 21/00
(52) U.S. Cl. ...................... 422/202; 422/146; 422/183; 422/203; 422/208; 422/240; 422/241; 422/242; 366/147; 165/169; 165/183
(58) Field of Search ............................... 422/148, 192, 422/202, 140, 146, 167, 241, 242, 240, 203, 422/208; 60/274; 366/147; 165/169, 183, 165/184, 168

(56) References Cited

U.S. PATENT DOCUMENTS

| 1,160,217 | A |   | 11/1915 | Valerius ..................... 366/191 |
| 2,537,472 | A |   | 1/1951  | Massiot |
| 2,744,391 | A |   | 5/1956  | Deane ......................... 62/451 |
| 3,297,412 | A |   | 1/1967  | Phillips, Jr. et al. |
| 3,318,376 | A |   | 5/1967  | Vihl ............................ 165/169 |
| 3,732,266 | A |   | 5/1973  | Dudrow |
| 4,029,143 | A |   | 6/1977  | Goebel |
| 4,321,234 | A | * | 3/1982  | Ohsaki et al. ............... 422/200 |
| 4,449,828 | A |   | 5/1984  | Mansour ..................... 366/147 |
| 5,033,264 | A |   | 7/1991  | Cabral ......................... 60/274 |
| 5,131,232 | A | * | 7/1992  | Uno et al. ...................... 62/62 |
| 5,326,537 | A |   | 7/1994  | Cleary ......................... 422/172 |
| 5,375,423 | A |   | 12/1994 | Delatte |
| 5,387,396 | A | * | 2/1995  | Dallmeyer et al. ......... 422/106 |
| 5,667,758 | A |   | 9/1997  | Matsugi et al. ............. 422/198 |
| 5,779,988 | A |   | 7/1998  | Zardi et al. ................. 422/148 |

FOREIGN PATENT DOCUMENTS

| DE | 1958 261      | 6/1970 |
| DE | 2005 145      | 8/1971 |
| EP | 0 263 935 A2  | 4/1988 |
| EP | 0 423 944 A1  | 4/1991 |
| EP | 0 659 475 A1  | 6/1995 |

(Continued)

OTHER PUBLICATIONS

John Garvin, Understand the Thermal Design of Jacketed Vessels, Chemical Engineering Progress, Jun. 1999, pp. 61-68.*

Derwent Publications Ltd., XP002095502, Class J04, AN 90-211512, Section Ch, Week 9028

*Primary Examiner*—Basia Ridley
(74) *Attorney, Agent, or Firm*—RatnerPrestia

(57) ABSTRACT

A reaction vessel which includes internally placed temperature controlling mixing baffles in which liquid is boiled, resulting in an isothermal heat sink. The energy of vaporization is supplied by the reaction vessel contents. The vapor produced by the boiling is directed to channel coils which surround the outside of the reaction vessel wall. The channel coils contact the outside wall of the reaction vessel perpendicularly, and provide mechanical support for the reaction vessel. The mechanical support from the channel coils allows for a decrease in the thickness of the reaction vessel wall and corresponding increased heat transfer efficiency between the channel coil contents and the reaction vessel contents. The entire above described apparatus is enclosed within an evacuated shell to provide additional insulation. The apparatus includes a gravitationally powered device that ensures that saturated or sub-cooled liquid enters the isothermal mixing baffles, thus guaranteeing that isothermal phase change will occur therein.

4 Claims, 24 Drawing Sheets

FOREIGN PATENT DOCUMENTS

| | | | | | |
|---|---|---|---|---|---|
| FR | 1347008 | 7/1962 | JP | 04293538 | 10/1992 |
| GB | 467564 | 6/1937 | WO | WO 98/57741 | 12/1998 |
| GB | 871752 | 7/1961 | | | |

* cited by examiner

TEMPERATURE CONTROLLED REACTION VESSEL

CROSS-REFERENCE TO RELATED APPLICATION

This application is a continuation-in-part of U.S. application Ser. No. 08/878,372 filed Jun. 18, 1997 now abandoned.

FIELD OF THE INVENTION

The present invention relates to chemical or biological reactors generally, and in particular to an apparatus for controlling the temperature within a chemical reactor.

BACKGROUND OF THE INVENTION

Temperature control of a chemical reaction is often the key to obtaining desired products. Where the temperature is controlled, generally the reaction kinetics are controlled. Where the reaction kinetics are controlled, undesired intermediates and byproducts can be diminished or avoided. Traditional temperature control of industrial reactors is generally attained in one of two ways. One method is to control the temperature of the reactants as they enter the reactor. This method fails to address the heat of reaction, which is often responsible for the majority of heat produced or absorbed in a reaction. The heat of reaction can then alter the temperature of the reactants to produce undesirable products. This is especially true for tank reactors.

Conversely, endothermic reactions require the addition of heat during the reaction to maintain the temperature of the reactants. Again, pre-adjustment of the temperature of reactants fails to adequately address this situation. Further, complicated production processes may have exothermic and endothermic reactions taking place (usually at different times) as reactants are added or products withdrawn. Pre-adjustment of reactant temperature is clearly totally inadequate in such situations.

A second method of temperature control of industrial reactors involves the placement of a jacket around the outside of the reaction vessel. In such a case, a fluid of desired temperature is passed through the jacket, thereby cooling or heating the reaction medium. The effectiveness of the jacket is limited by heat transfer properties which are in turn limited by mechanical design characteristics and geometry, including specifically vessel diameter and length. Material of construction, wall thickness, vessel diameter and length are critical design parameters for both strength and heat transfer. Unfortunately, however, heat transfer and mechanical strength are competing values in reactor design. For a given vessel diameter and length, the reactor wall may be thick enough to meet pressure and strength requirements, but too thick for optimal heat transfer between the jacket fluid and the reaction medium, as heat transfer is decreased with increased wall thickness. Where the reactor wall is thinned to improve heat transfer, the structural integrity of the vessel is diminished. This trade-off has historically been the source of design efforts seeking to gain maximum heat transfer efficiency while meeting mechanical strength requirements. If there is an increase in vessel diameter for a given length, the wall becomes weaker under internal pressure and weaker (to a higher order) under external pressure. Increasing vessel diameter, for a given length, also decreases (heat-transfer) surface to reacting medium volume, further inhibiting heat transfer mechanisms.

In the design of reactor cooling systems, two additional concerns arise when low temperatures are needed and cryogenic fluids are being contemplated for use as refrigerants. First, the temperature of the jacket fluid is calculated based on heat transfer requirements for a given reaction medium and reactor design. The required jacket fluid temperature is often below the freezing point of the reactor medium. As a consequence, the reactor contents can freeze along the inside of the reactor wall. The formation of "ice" results in a thicker wall overall and decreased heat transfer efficiency, as well as potentially inconsistent reactor medium composition, and in some cases, destruction of some reactants or products through freezing. Second, when a cryogenic fluid changes phase the vapor generated could occupy as much as 100 times the same volume as the liquid from which it originated. This large increase in specific volume can lead to erratic heat transfer mechanisms and, consequently, poor reactor medium temperature control.

Thus, there is a need for an improved apparatus for controlling the temperature of a reactor during operation that would allow for a (1) thin wall and resultant increased heat transfer to the contents and (2) increase of reactor size (diameter and length) without sacrificing the required mechanical properties of the reactor. Additionally, such an apparatus which prevents the build-up of frozen reactor contents would maintain high heat transfer efficiency and constant reactor medium temperature gradients, resulting in homogeneous and uniform reaction kinetics. The desired reactor would maximize the desired properties of high mechanical strength and high heat transfer efficiency, two qualities which have historically competed, regardless of size (i.e. diameter and length).

SUMMARY OF THE INVENTION

The present invention is an insulated chemical or biological reactor (such as a fermenter) system comprising a reaction vessel, an evacuated insulation shell, a plurality of temperature controlling mixing baffles immersed in the reactor contents and a temperature controlling helical channel coil outside of the reactor but inside the evacuated shell. A device designed to control the separation of phases of the working fluid chosen is required and may be external to the reactor. This device is referred to as the phase separator and has two outlets, one for each phase of the working fluid. The temperature controlling mixing baffles are designed to accept the working fluid in a single phase proceeding from one outlet of the phase separator and to, in turn, cause this fluid to change phase therein without carryover of any of the inlet fluid in the evolved phase. The changing of phase of the working fluid in the temperature controlling mixing baffles takes place at a uniform temperature, the level of which is dictated by the thermodynamic properties of the working fluid selected. The temperature controlling mixing baffles are referred to as isothermal mixing baffles. The channel coil is adapted to accept a circulating fluid, specifically of a single phase evolved by the mixing baffles and the other outlet of the phase separator. The particular working fluid selected depends on the intended temperature control purposes, that is whether heating or cooling is desired and the degree of heating or cooling needed. The channel coil is affixed to the outside wall of the reactor in a helical configuration and adapted to receive the single phase of the working fluid evolved by the mixing baffles and the other outlet of the phase separator which flows spirally upward or downward around the outside of the reactor. The channel coil is shaped to have two straight, parallel sides of the coil in contact with the reactor, normal to the surface of the outside wall of the reactor. This right angle contact between the channel coil and reactor wall increases the section modulus of the vessel wall, and thereby increases the mechanical strength of the reactor wall under external pressure. The wall can thus be made thinner to promote better heat transfer across the wall. The reactor, including the mixing baffles and the affixed coil, are together enclosed within an evacuated jacket.

The separation of the phases of the working fluid is very important for the optimal and predictable operation of the present invention, particularly when cooling of the reactor contents is anticipated. In the cooling mode the isothermal cooling baffles are intended to boil the working fluids which enter as a liquid and evolve only a saturated vapor with no liquid carryover in the form of droplets or mist. The isothermal mixing baffles, therefore, operate in the boiling heat transfer regime exchanging the latent energy of vaporization (at constant temperature) with the reactor contents. The vapor evolved from the isothermal mixing baffles, as well as the vapor evolved from the phase separator upstream therefrom is commingled and directed to enter the helical channel coil that serves as the reactor external jacket, wherein it exchanges sensible thermal energy with the reactor contents, gaining temperature to approach that of the reactor contents as it travels further along the inside of the coil.

The present invention thus controls heat transfer regimes by assuring that distinct single phases will exist in the isothermal mixing baffles (boiling liquid for cooling mode; condensing vapor for heating mode) and helical channel coil (vapor increasing in temperature for cooling mode; liquid decreasing in temperature for the heating mode).

The isothermal mixing baffles, of which there are typically at least two, are vertically oriented, elongated, generally cylindrical devices with an inlet and an outlet. As with the jacket, the isothermal mixing baffles may be used for heating or cooling the contents of the reaction vessel. Where heating is desired, a hot liquid or gas can be introduced into the isothermal mixing baffles through the inlet. The resultant cooler liquid or condensed vapor or liquid can be removed via the outlet. Where cooling is desired, upstream of the isothermal mixing baffles inlet there is provided a phase separator to insure only a liquid stream enters the isothermal mixing baffles. The inlet to the isothermal mixing baffles is typically placed into the top of the reactor and a liquid of desired boiling point is allowed to enter the isothermal mixing baffles while the reactor is in use. Where cooling is desired, the liquid selected would have a boiling point at or below the desired reaction temperature. The heating and boiling of the liquid introduced into the isothermal mixing baffles provides for the removal of heat from the reactor contents. For additional temperature control, the vapor produced from the boiling of the isothermal mixing baffles contents may be taken from the top of the isothermal mixing baffles, coming led with gas emanating from the phase separator and passed through the channel coil surrounding the outside of the reaction vessel.

The isothermal mixing baffles are designed and arranged so that their combined cross-sectional area will be such that the velocity of the vapor evolved from the liquid phase boiling therein will be below a critical value, $U_c$, above which droplets or slugs of the liquid phase will be entrained in the evolved gas and expelled from the isothermal mixing baffles. To accomplish this requirement, the inlets and outlets of the isothermal mixing baffles will be piped in parallel.

Thus in one aspect the present invention is an insulated chemical reactor comprising; a reaction vessel having a wall with inner and outer surfaces, an evacuated insulation shell spaced apart from and surrounding the reaction vessel, at least one isothermal mixing baffle disposed within the reaction vessel, a phase separator in fluid communication with the baffle so that only one saturated or sub-cooled liquid phase of a heat transfer working fluid enters the isothermal mixing baffle, a temperature controlling helical channel coil fixed to the outer surface of the wall of the reaction vessel, the helical channel coil having at least two walls disposed normal to the outer surface of the wall of the vessel, thus defining an open helical channel coil fixed to the wall of the vessel, the helical channel coil having a winding pitch so that successive coils of the channel coil are spaced apart from each other, thus defining a closed path to receive a fluid to contact the wall of the reaction vessel, the wall of the reaction vessel being of a thickness less than that required for use under a given temperature and pressure regime, the channel coil serving to add structural strength to the wall of the reaction vessel, so that the reaction vessel with the channel coil fixed thereto can be operated under the temperature and pressure regime; the helical channel coil fixed to the outer surface to enhance conductive heat transfer and transfer of convective energy flow inside the helical channel coil through the wall of the vessel; and means to combine vapor from the phase separator and vapor from the isothermal mixing baffle and introduce the vapor into the helical channel coil.

Thus in another aspect the present invention is an apparatus for isothermally cooling contents of a reaction vessel having a top and bottom, by allowing a saturated or subcooled liquid to boil inside an isothermal mixing baffle immersed in the reactor contents, to produce gas inside the isothermal mixing baffle, comprising; a vertically oriented, elongated generally cylindrical isothermal mixing baffle having a top and a bottom, the isothermal mixing baffle immersed in the contents in the reaction vessel, means for introducing the liquid into the top of the isothermal mixing baffle to a predetermined level, means for removing gas from the isothermal mixing baffle, and, means for controlling the level of liquid in the isothermal mixing baffle.

In yet another aspect the present invention is an apparatus for supplying saturated or superheated gas to a temperature controlling helical channel coil disposed helically around a reaction vessel, comprising; an isothermal mixing baffle, immersed in contents contained in the reactor, as mixing baffle containing a saturated or subcooled liquid, means for supplying vapor discharged from the isothermal mixing baffle to the helical channel coil, means for monitoring flow of the vapor into the helical channel coil, and, means for controlling flow of vapor into the helical channel coil.

In still another aspect the present invention is a method for controlling the temperature in a reaction vessel comprising the steps of; disposing a helical channel temperature control coil around an outside surface of the reaction vessel, introducing a heat transfer working fluid into a phase separator, withdrawing a liquid portion of the working fluid from the phase separator and introducing the liquid portion into an isothermal mixing baffle disposed in contents contained in the reaction vessel, withdrawing a vapor portion of the working fluid from the phase separator and mixing it with a vapor phase working fluid withdrawn from the isothermal mixing baffle to produce a mixed heat exchange fluid; and introducing the mixed heat exchange fluid into said helical channel coil.

DETAILED DESCRIPTION OF THE PREFERRED EMBODIMENT

Figure 1A:
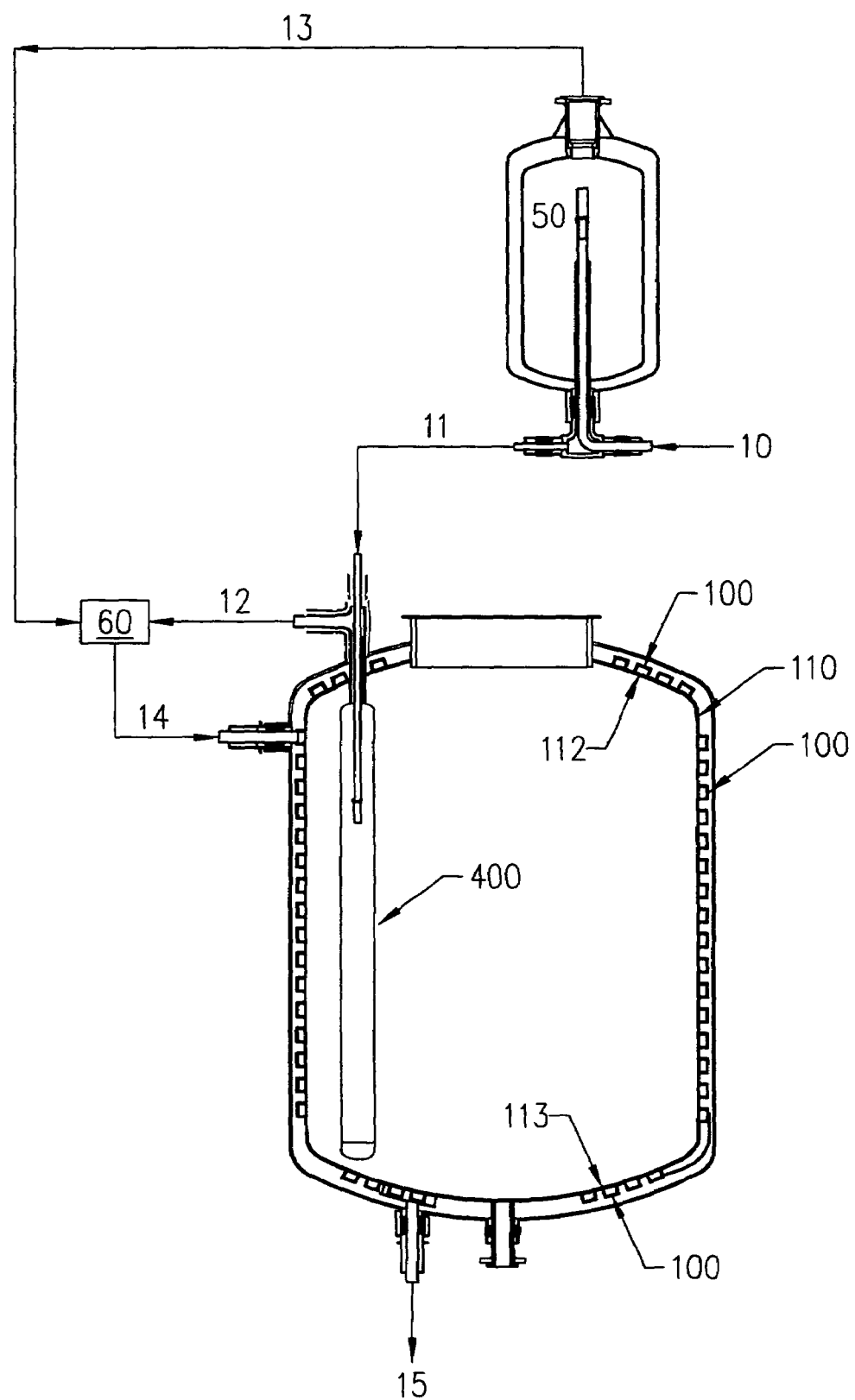
FIG. 1A is a flow diagram that depicts the flow scheme of the present invention in a cooling mode for the phase separator and the reaction vessel, which contains internal isothermal mixing baffles and an external helical channel coil.

In the prior art, increasing reactor size (diameter and length) affects heat transfer to the reactor contents as the distance from the reactor external jacket to the centerline of the reactor increases (this is the radius). The present invention eliminates this problem as the insertion of isothermal mixing baffles in the reactor contents brings heat sinks (cooling) or sources (heating) to the contents as required to achieve temperature uniformity.

Since most reactors are basically cylindrical, there is a circular interface region between the highest level of the content and the empty (head) space above it. The ratio of this content/head space cross-sectional area to the volume of the content increases with increasing level of content.

With good mixing and temperature uniformity, the reactions in the content occur homogeneously in the bulk of the liquid content. Evolved gases, however, must pass through the circular content/head space interface. Therefore, as the reactor content level is increased the surface to volume ratio decreases and the potential for the flux of evolved gases increases. In this instance, foaming of contents can occur.

Foaming occurs because the evolved gas flux across the content/head space interface increases above a critical point. The gas flux in question is defined as velocity/cross-sectional area. Once foaming occurs, some of the contents are out of solution and remain un-reacted, thus affecting the uniformity and extent of the desired reactions.

Consider a simple experiment where a pint of beer is poured into a regular 1 pint glass with diameter D and height h where $h/D \approx 4$. Then pour an equivalent amount in a shallow pan with h/D≈1. The beer in the pint glass will require three to four times more "breathing" time than the beer in the shallow pan.

This problem is exacerbated by the use of an agitator (for mixing reactor content) which, consistent with the First law of Thermodynamics, delivers shaft energy to the content as kinetic energy and can locally exceed the latent heat of vaporization at the blade edges. This is known as cavitation amongst mariners.

The careful placement of the isothermal mixing baffles and the engineering of the geometry thereof can mitigate or eliminate the foaming problem.

The last performance characteristic of note is the requirement that the reactor content must be able to be placed under a vacuum for the purpose of crystallization, evaporation of solvent or vacuum distillation. In typical commercial-size reactors, typically 300 gallons and larger, the vessel wall must be thicker to withstand the external pressure due to vacuum on the inside, than otherwise required for internal pressure alone; external pressure is said to be the controlling wall thickness criteria. The present invention addresses this issue by configuring the jacket coil in such a unique way that allows for smaller wall thickness under internal content vacuum conditions, thus internal pressure becomes the controlling wall thickness criteria for the operating range of the reactor.

FIG. 1A is a flow diagram that depicts the flow scheme of the present invention in a cooling mode for the phase separator 50 and the reaction vessel 110, which contains isothermal mixing baffles 400 and the helical channel coil 100 fixed to the outer surface of reaction vessel 110. For the purposes of illustration only one baffle is shown. In a preferred embodiment the helical channel coil 100 may also extend to cover the upper head 112 and lower head 113 of reaction vessel 110. Low "quality" (low vapor content) working fluid shown by arrow 10 enters the phase separator 50 and is split into a vapor phase shown by line 13 and a liquid phase shown by line 11, the separation effected by gravitational means. The liquid phase 11 from the phase separator is piped to the isothermal mixing baffle(s) 400, wherein it changes into a vapor shown by line 12 by boiling and absorbing thermal energy from the contents inside the reaction vessel 110. The vapor 13 emanating from the phase separator 50 is commingled with the vapor 12 generated in the isothermal mixing baffles 400 in a mixing chamber 60. The now combined vapor streams shown by line 14 are fed into the helical channel coil 100, wherein the vapor absorbs sensible thermal energy from the content inside the reaction vessel 110 until it exits the channel coil via line 15 at a temperature very close to that of the average temperature of the reactor content.

Figure 1B:
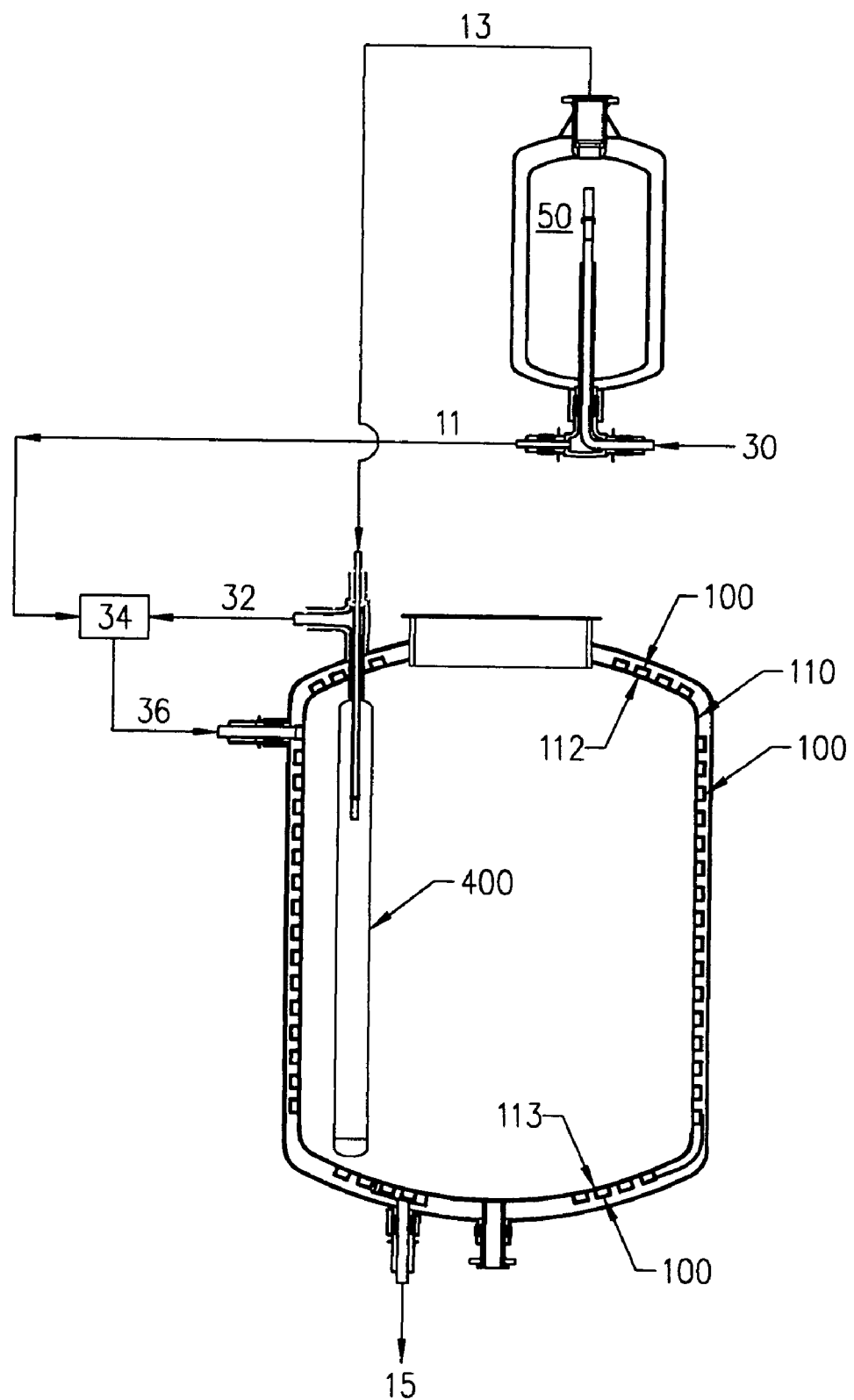
FIG. 1B is a flow diagram that depicts the flow scheme of the present invention in a heating mode for the phase separator and the reaction vessel, which contains internal isothermal mixing baffles and an external helical channel coil.

FIG. 1B is a flow diagram that depicts the flow scheme of the present invention in a heating mode for the phase separator 50 and the reaction vessel 110, which contains the isothermal mixing baffle(s) 400 and the helical channel coil 100 fixed to the outer surface of reaction vessel 110. In a preferred embodiment the helical channel coil 100 may also extend to cover the upper head 112 and lower head 113 of reaction vessel 110. High "quality" (mostly vapor content) working fluid shown in line 30 enters the phase separator 50 and is split into a vapor phase shown by line 13 and a liquid phase shown by line 11, the separation effected by gravitational means. The vapor phase 13 from the phase separator 50 is piped to the isothermal mixing baffle(s) 400, wherein it changes into a liquid by condensing and delivering thermal energy to the content inside the reaction vessel 110. The liquid 11 emanating from the phase separator 50 is commingled with the condensate in line 32 generated in the isothermal mixing baffle(s) 400 in a separate mixing chamber 34. The now combined liquid streams in line 36 are fed into the channel coil 100, wherein the liquid delivers sensible thermal energy to the content inside the reaction vessel 110 until it exits the channel coil in line 15 at a temperature very close to that of the average temperature of the reactor content.

Figure 2A:
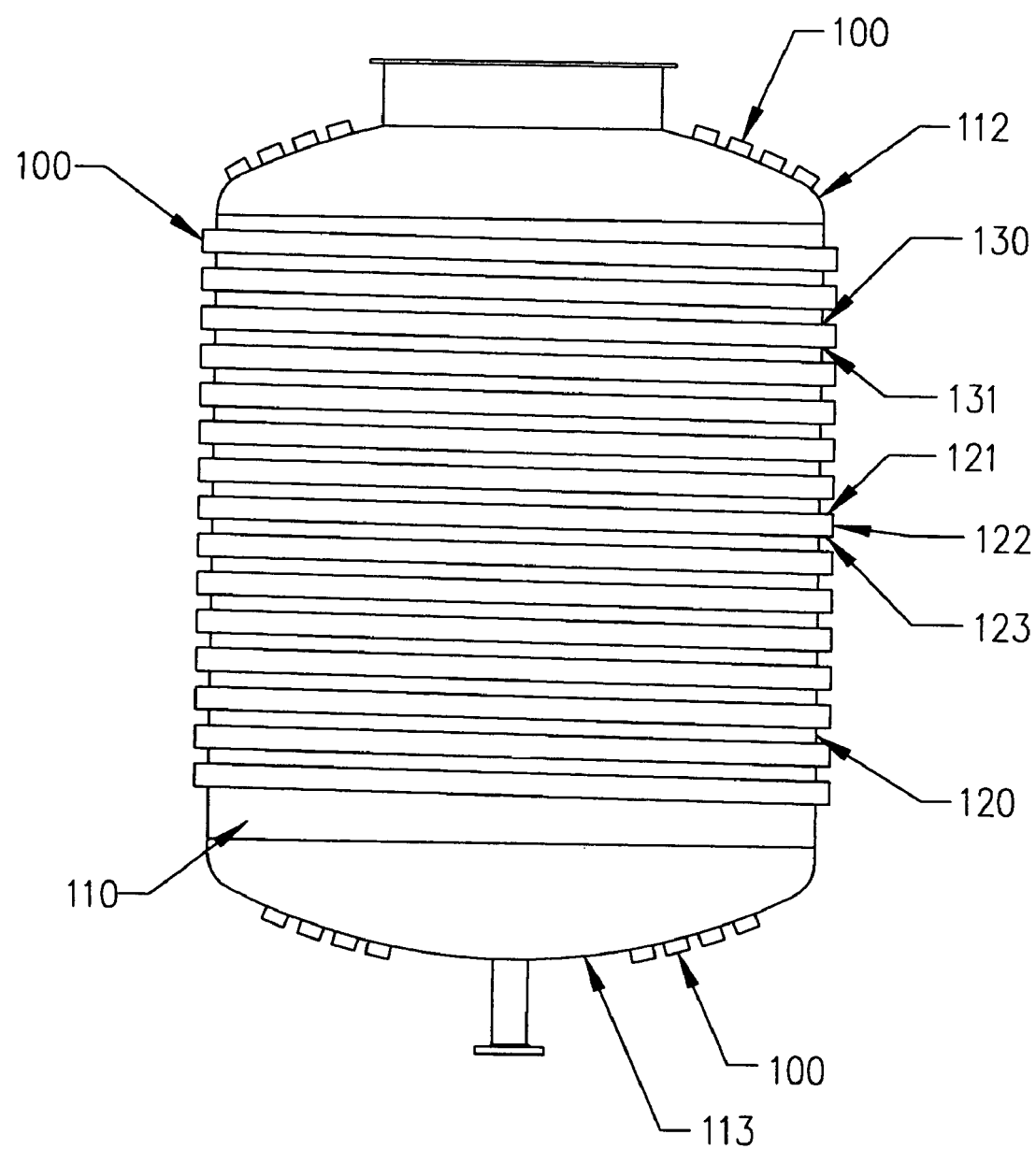
FIG. 2A is a side view of a reaction vessel having a cylindrical cross-sectional shape with an external channel coil according to the present invention.

FIG. 2A is a cross-sectional view of a reaction vessel 110 with a channel coil 100 fixed to the outer surface in a helical wound arrangement. In a preferred embodiment, the reaction vessel 110 consists of a cylindrical section 120 and two "dished" heads, an upper head 112 and a lower head 113. The inside wall of channel coil 100 is the outside surface of wall 120 of reaction vessel 110 and will be disposed along the axial length of the cylindrical section 120 of reaction vessel 110. The channel coil 100 may also cover part of the upper head 112 and/or the lower head 113. The channel coil 100, before it is fixed to the reaction vessel 110, has only three outer sides, 121, 122, and 123. A fourth side of the channel coil 100 is formed by the outer surface of the wall of cylindrical section 120 of the reaction vessel 110. A closed channel is only achieved when the channel coil 100 is fixed to the outer surface of reaction vessel 110. The channel coil 100 surrounds the reaction vessel 110 in a helical configuration. The configuration allows for helical and corresponding downward or upward flow, with respect to the central vertical axis of the reaction vessel 110. The channel coil 100 may be constructed from any suitable material, the most likely for industrial use being carbon steel, stainless steel, Inconel (trademark for an alloy of nickel and chromium available from the Huntington Alloy Products Division of International Nickel Co. Inc. of Huntington, W. Va.), and any number of Hastelloy alloys, including Hastelloy C-276 and Hastelloy B-2. Hastelloy is a trademark for nickel-based corrosion-resistant alloys obtained from Union Carbide Corp. of New York, N.Y. Hastelloy C-276 is a nickel-based alloy containing nickel, chromium, molybdenum, tungsten, iron, carbon and silicon. Hastelloy B-2 differs from Hastelloy C-276 in that it does not contain tungsten and the other components appear in different concentrations.

Figure 2B:
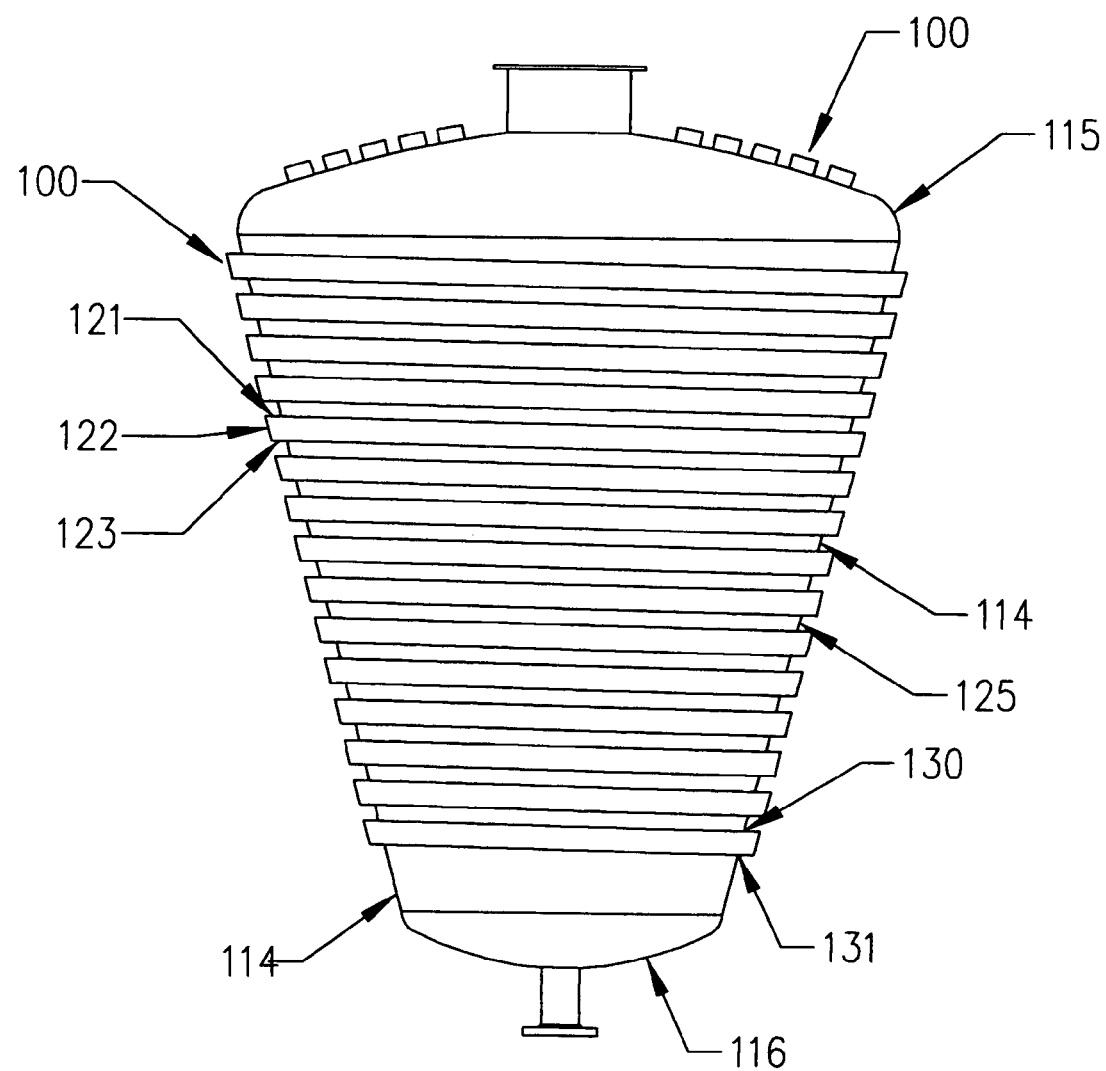
FIG. 2B is a side view of reaction vessel with an external channel coil according to an alternate embodiment of the present invention.

As shown in FIG. 2B, in an alternate embodiment, the cylindrical section 120 of reaction vessel 110 of FIGS. 1A and 1B can be fabricated as a conical reactor 114 having a tapered wall 125 and two "dished" heads, a larger upper head 115 and a smaller lower head 116. This alternate embodiment allows for better mixing of the contents and is advantageous in applications where gaseous reaction by-products are generated in the reaction vessel content.

Figure 3A:
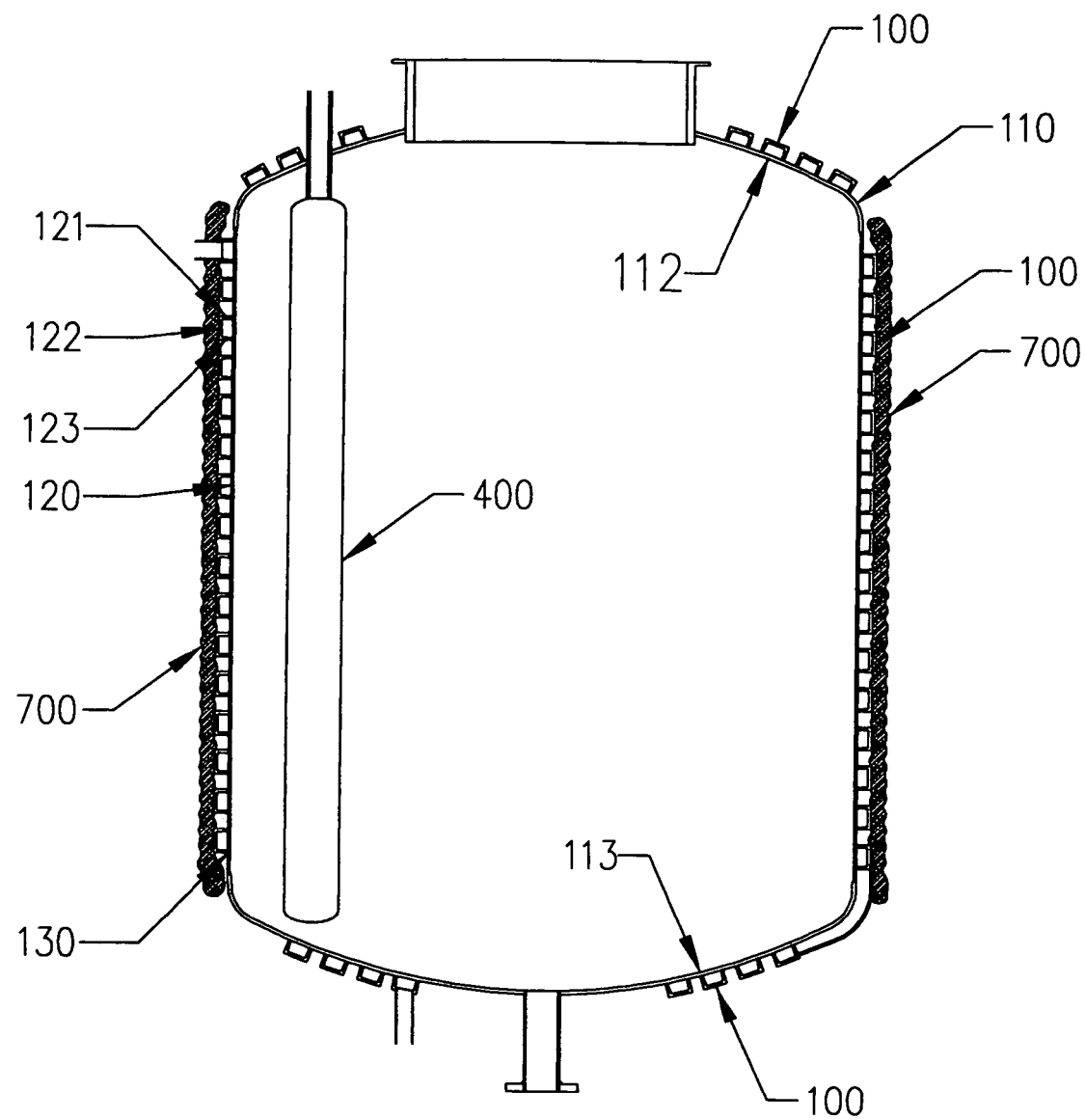
FIG. 3A is a cross-sectional view of the generally cylindrical reaction vessel of FIG. 2A with an external helical channel coil, and integral isothermal mixing baffle entering the reactor vessel from the top in accordance with the present invention.
Figure 3B:
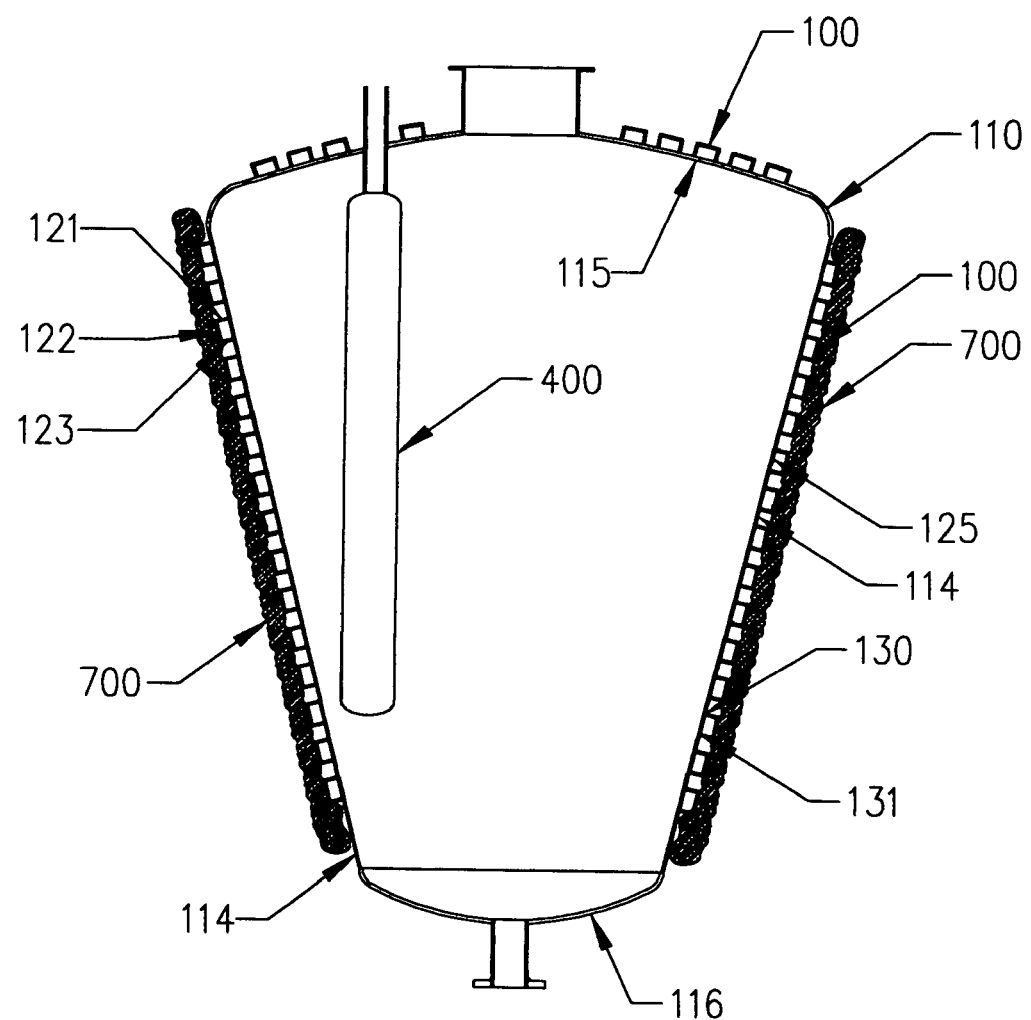
FIG. 3B is a cross-sectional view of the reaction vessel of FIG. 2B with an external helical channel coil, and integral isothermal mixing baffle entering the reactor vessel from the top.

FIG. 3A is a cross-sectional view of the cylindrical reaction vessel 110 of with integral channel coil 100 and integral isothermal mixing baffle 400 (one only shown for simplicity). FIG. 3B is a cross-sectional view of a conical reactor 114 with integral channel coil 100 and integral isothermal mixing baffle 400 (one only shown for simplicity). FIG. 2A, FIG. 2B, FIG. 3A and FIG. 3B show two characteristics of channel coil 100, which combine to add mechanical strength to reaction vessel 110. The first is that the point of contact 130, 131 is a right angle to the reaction vessel wall 120, 125 respectively in the vertical section of the reaction vessel 110 or the tapered wall section of conical reactor 114, as well in the upper heads 112, 115 and lower heads 113, 116 respectively. That is, walls 121 and 123 form a right angle with walls 120 and 125. In the preferred embodiment shown in FIGS. 1A and 3A, walls 121 and 123 must form a right angle with the axis of the cylinder reaction vessel 110 having a vertical cylindrical section where the channel coil is fixed to the wall 120. In the upper 112 and lower 113 head sections of the reaction vessel 110, walls 121 and 123 are perpendicular to the line tangent to the convex (external) surface of the head, 112 or 113, where the tangent point is at the bisector between 121 and 123. The channel coil 100 surrounding wall 120 of vessel 110 and wall 125 of vessel 114 can be covered with insulation 700.

The same effect is achieved for the reaction vessels of FIGS. 2B and 3B where the vertical section has a cone shaped wall 125 by fixing portions 121 and 123 perpendicular to wall 125. The perpendicularity of portions 121 and 123 of channel coil 100 to wall 120 or wall 125 of the reaction vessel 110 or 114 is required in order to meet the criteria established by section UG-28 of the ASME Boiler And Pressure Vessel Code Section VIII Division 1 so that elements 121, 122 and 123 can be considered as adding strength to the wall 120 under external pressure. The second characteristic adding strength to reaction vessel 110 concerns the pitch at which the helical channel coil 100 is affixed to the reaction vessel wall 120. For the vertical portion (cylindrical or tapered wall) of the reaction vessel 110 or 114, the pitch is the slope of the coil 100, with respect to a horizontal radial plane which is perpendicular to the vertical axis of the reactor. A larger slope is considered a higher pitch. The channel coil 100 is affixed at a pitch less than or equal to a maximum pitch, which is that pitch beyond which the desired improvements in the reaction vessel wall 120, 125 section modulus are no longer achieved, as dictated by the rules of pressure vessel design codes such as ASME Section VIII, Division 1, sections UG-27 and UG-28 thereof. Section UG-27 explains how to calculate "Thickness of Shells Under Internal Pressure", and section UG-28 describes how to calculate "Thickness of Shells and Tubes Under External Pressure". Exactly what this pitch is will depend on many factors. As to reaction vessel 110 or 114 these include the diameter of reaction vessel 110, the average diameter of vessel 114, the material of construction of the reaction vessel and the operating parameters for which the reactor is designed. As the pitch (or slope) of the coil increases, the distance between successive coils increases. The coil is made of elements 121 and 123 that are perpendicular to the vessel wall, 120, 125 which allows for the vessel, under the rules of pressure vessel design codes such as ASME Section VIII, Division 1 to take credit for the reinforcement to reaction vessel wall 120, 125. As the distance between successive coils increases the degree of reinforcement decreases. At some point, the degree of reinforcement becomes too low and reaction vessel wall 120, 125 becomes too weak for the desired function. The reinforcement required will depend upon the differential pressure between the inside and outside of reaction vessel wall 120, 125. This is a design parameter easily calculated by one skilled in the art. Thus, the maximum pitch of channel coil 100 will depend on the designed maximum operating pressure for reaction vessel 110, 114 among other factors. For example for the head sections 112, 113 of the reaction vessel 110, the pitch is the distance of each helical 360° course of the coil 100, with respect to the previous and/or subsequent helical 360° course. A greater separation is considered a higher pitch. The channel coil 100 is fixed at a pitch less than or equal to a maximum pitch, which is that pitch beyond which the desired improvements in the reaction vessel wall 120 section modulus are no longer achieved, as dictated by the rules of pressure vessel design codes such as ASME Section VIII, Division 1, sections UG-27 and UG-28 thereof. Section UG-27 explains how to calculate "Thickness of Shells Under Internal Pressure", and section UG-28 describes how to calculate "Thickness of Shells and Tubes Under External Pressure". Exactly what this pitch is will depend on many factors including the diameter of reaction vessel 110, the material of construction of the reaction vessel 110 and the operating parameters for which the reactor is designed. As the pitch (separation) of the coil 100 fixed to the upper or lower heads 112 and 113 of reaction vessel 110 increases, the distance between successive coils increases.

The points of contact 130 and 131 between reactor vessel wall 120 and channel coil 100 of reaction vessel 110 and between reactor vessel wall 125 and channel coil 100 of reactor vessel 114 (FIGS. 2A, 3A and FIGS. 2B, 3B respectively) is a right angle, and the pitch of the channel coil 100 is less than or equal to the maximum pitch. These two factors combine to increase the section modulus of the reaction vessel 110. Under the rules of pressure vessel design codes such as ASME Section VIII, Division 1, section UG-28 thereof this resultant increase in the section modulus, due to the channel coil 100, allows the reaction vessel wall 120 be thinner than that which would otherwise be required when the channel coil 100 is not fixed according to the present invention in order to achieve desire maximum allowable pressure for reaction vessel working conditions. Because the reaction vessel wall 120 may be thinner than that which would be required without channel coil 100, improved heat transfer efficiency is achieved. A thinner reaction vessel wall increases the overall heat transfer coefficient across the reaction vessel wall because the thermal resistance resulting from the thermal conductivity of the reaction vessel wall is reduced. Under the rules of pressure vessel design codes such as ASME Section VIII, Division 1, the greatest advantage of the present invention is realized in larger diameter reaction vessels that operate at relatively low pressures, e.g., up to 10 bar and at full vacuum (FV). Under these conditions, the FV condition inside the reaction vessel dictates the use of thicker wall 120, 125 than otherwise be required to withstand positive internal pressure only. By using the present invention, the thickness of wall 120, 125 is controlled by positive internal pressure in the reaction vessel and will be thinner.

Figure 8A:
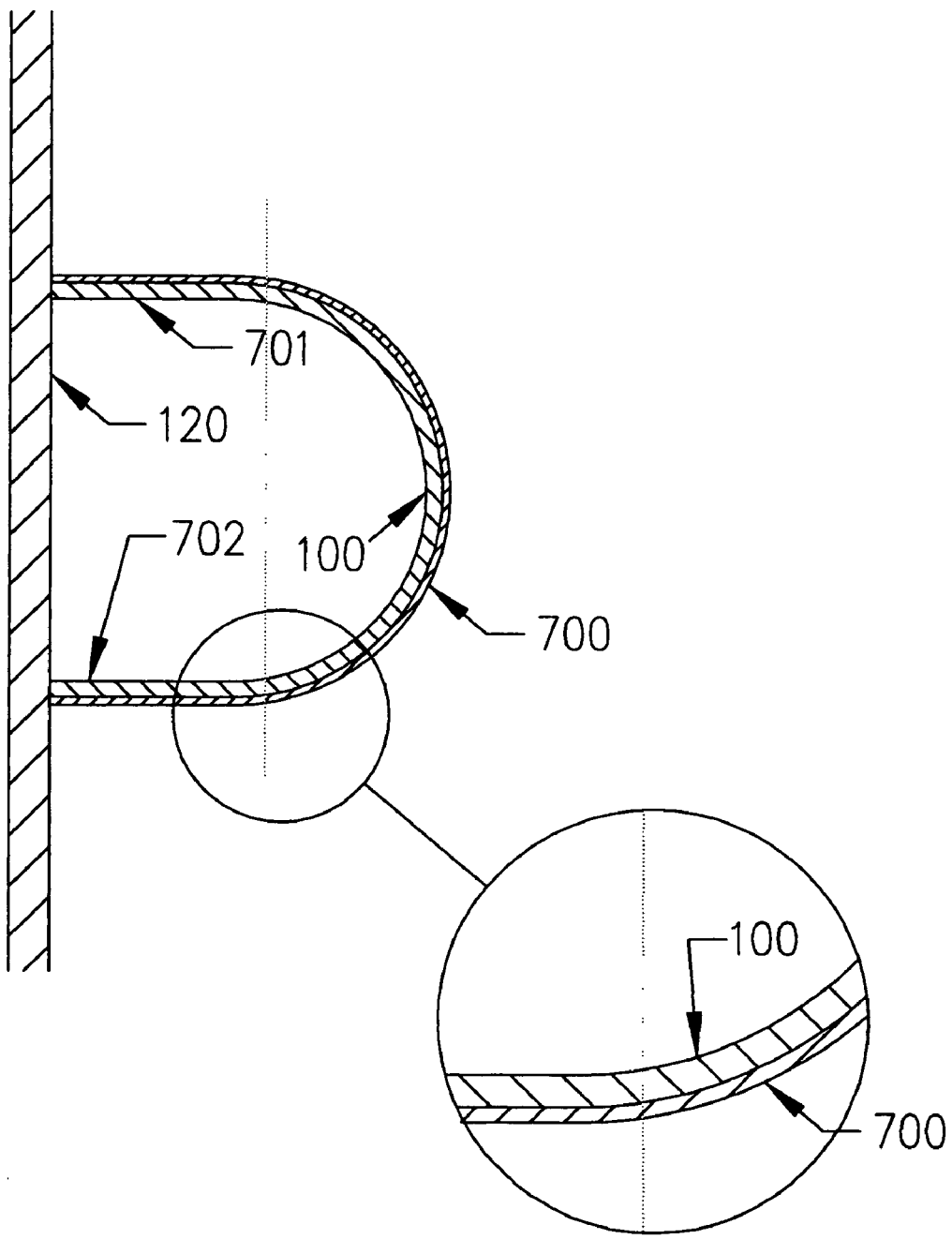
FIG. 8A is a fragmentary cross-sectional view of one embodiment of the channel coil according to the present invention.
Figure 8B:
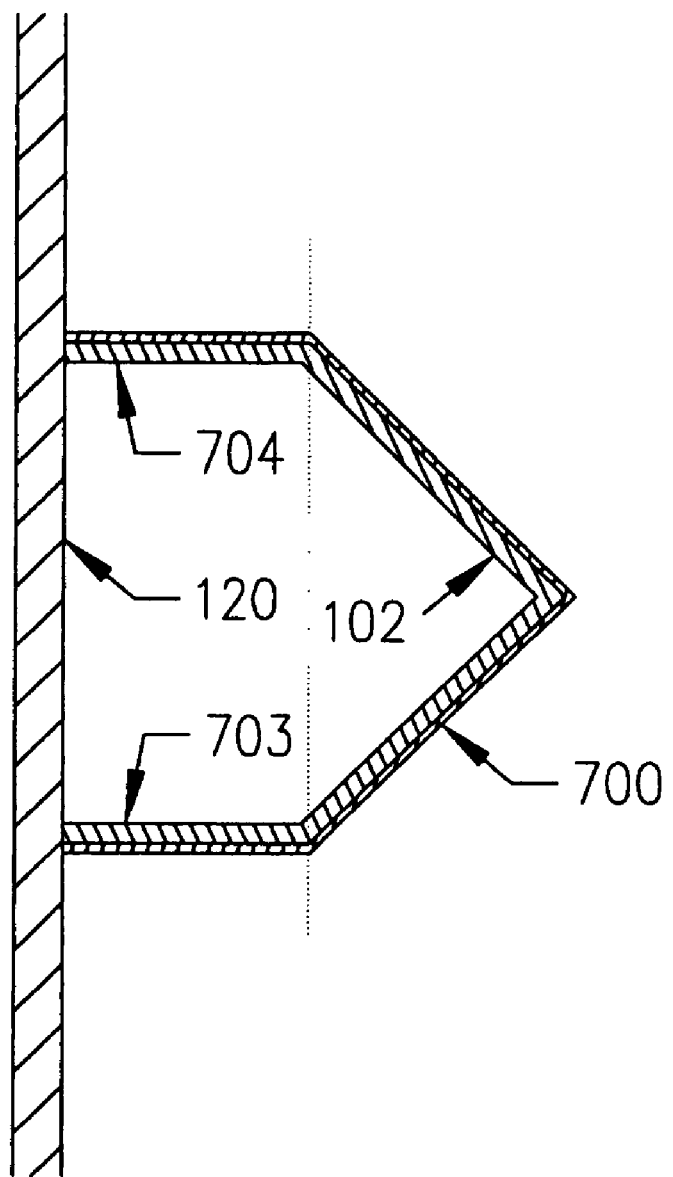
FIG. 8B is a fragmentary cross-sectional view of an alternate embodiment of a channel coil according to the present invention.
Figure 8C:
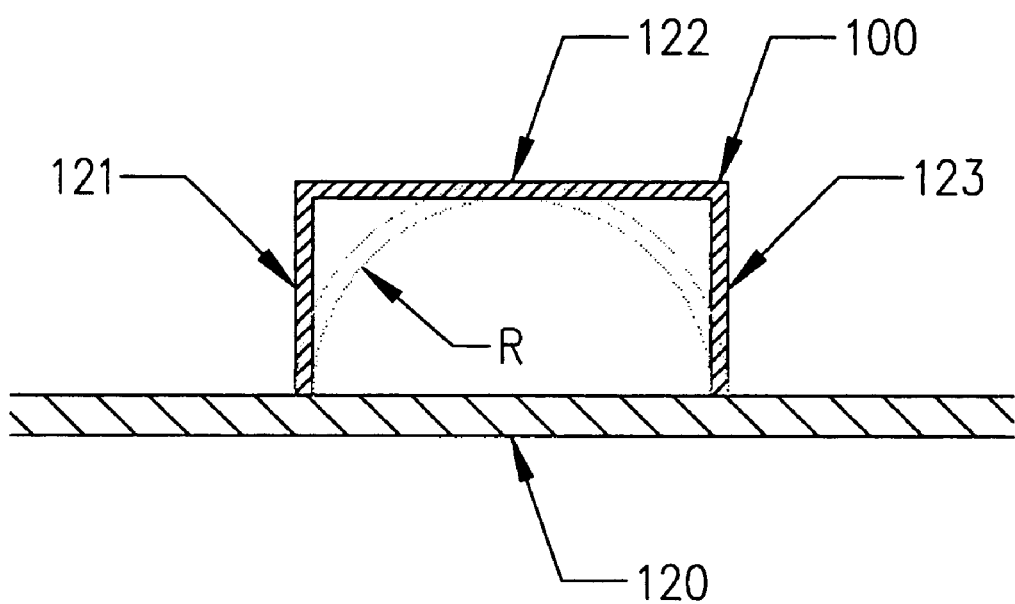
FIG. 8C shows a comparison of a conventional half-pipe jacket cross-section to that of the present invention.

One additional advantage of the present invention is evident by examining FIG. 8C, which depicts a comparison of a conventional half-pipe jacket cross-section R to that of the present invention with proportional dimensions. The cross-sectional area of a jacket coil 100 in accordance with the present invention, compared to that of a conventional half-pipe jacket coil R of proportional dimensions, is $4/\pi$ or 27% greater. This allows for higher fluid flow for the same unit pressure drop, and thus greater heat transfer.

Figure 4:
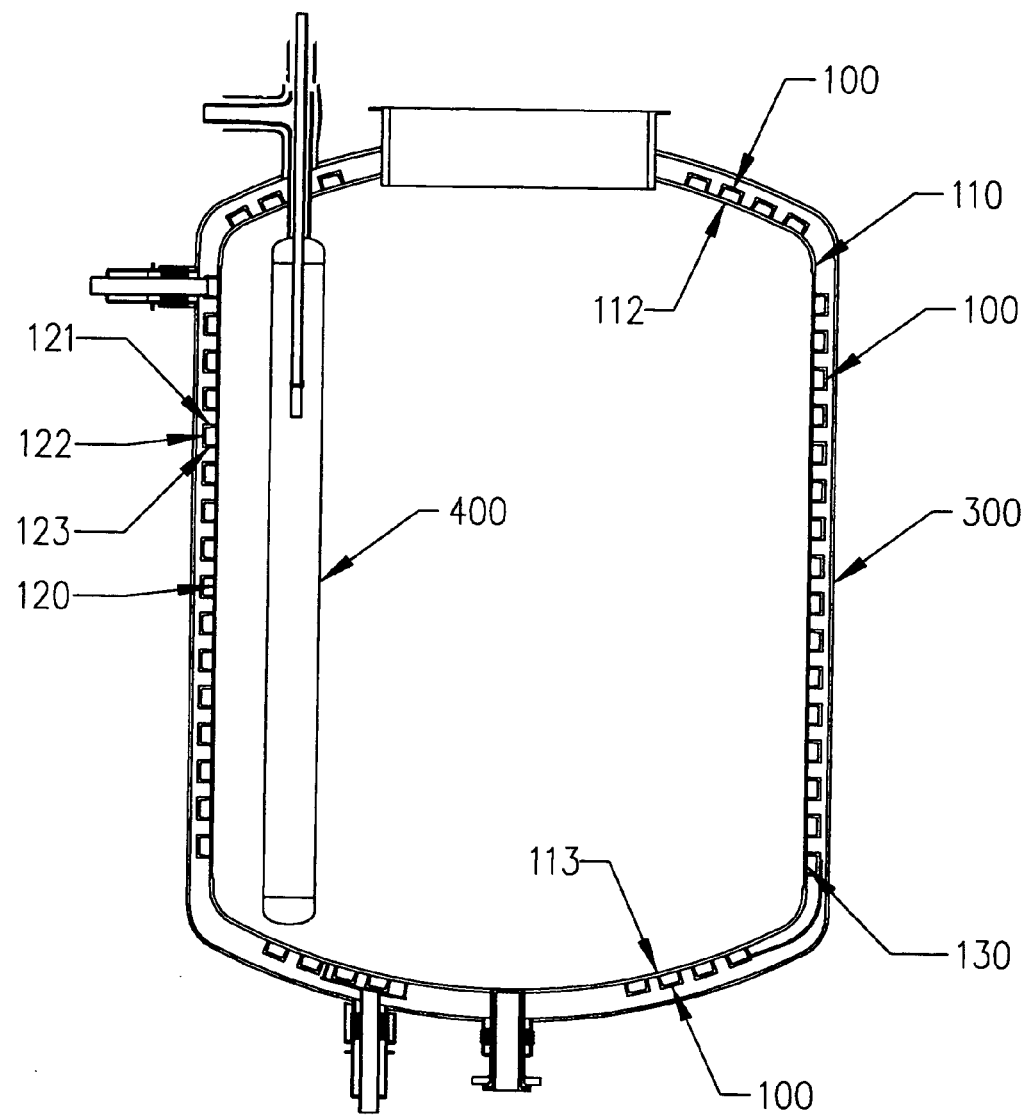
FIG. 4 is a cross-sectional view of a reaction vessel with an external channel coil, integral isothermal mixing baffle entering the reactor vessel from the top and evacuated jacket, in accordance with the present invention.

The channel coil 100 may be additionally insulated with insulation 700 attached directly to the three outer sides, 121, 122, and 123, of the coil 100 as shown in FIG. 8C. Alternatively, insulation 700 may be wrapped around channel coil 100 and reaction vessel 110 or reaction vessel 114 as shown in FIG. 3A and FIG. 3B, before placement in an evacuation shell. FIG. 4 shows vessel 110 placed inside evacuation shell 300. Insulation 700 may be any suitable material which does not out-gas when it is evacuated and/or heated. Reflective multi-layer insulation, made of alternating layers of fiberglass cloth, cured of any residues, which would otherwise out-gas when evacuated and/or heated, and aluminum foil are preferred. The alternate layer method of application may be varied, e.g. two layers of cloth and one layer of aluminum foil, etc. The "no out-gassing" requirement is essential for the evacuated multi-layer reflective insulation of the preferred embodiment to be successful.

An alternative insulation method for the reaction vessel entails the use of evacuated dry perlite powder in the annular space between the reaction vessel, which comprises the jacket coil 100 and vessel wall 120, and the evacuated shell 300, (FIG. 4). In this alternative embodiment, the physical space between the jacket coil 100 and the evacuated shell 300 must be at least six (6) inches, but typically eight (8) to twelve (12) inches in order for evacuated dry perlite powder to serve as a suitable insulation medium.

FIG. 4 is a sectional view of reaction vessel 110 with the channel coil 100 fixed to the outer surface of reaction vessel 110, integral isothermal mixing baffle 400 (one only shown for simplicity) and an evacuated shell 300. The evacuated shell 300 completely encloses reaction vessel 110 and channel coil 100, with the exception of related piping and utilities, which penetrate the evacuated shell 300. The placement of the evacuated shell 300 around the apparatus as described above allows for additional insulation of reaction vessel 110 and channel coil 100 from the ambient air. Insulation from the ambient air results in decreased heat transfer through both the reaction vessel wall 120 and the channel coil walls 121, 122, and 123, as some of the energy is parasitically lost outwardly to the environment through the insulation 700. The utilization of evacuated shell 300 results in greater temperature control of the reaction vessel contents, making the insulation 700 more thermally efficient. The evacuated shell may be constructed from any suitable material, including carbon steel, stainless steel, Inconel, or Hastelloy C. Further, evacuated shell 300 can also include reflective material on the inner or outer surface thereof to reduce radiant heat transfer.

Figure 5A:
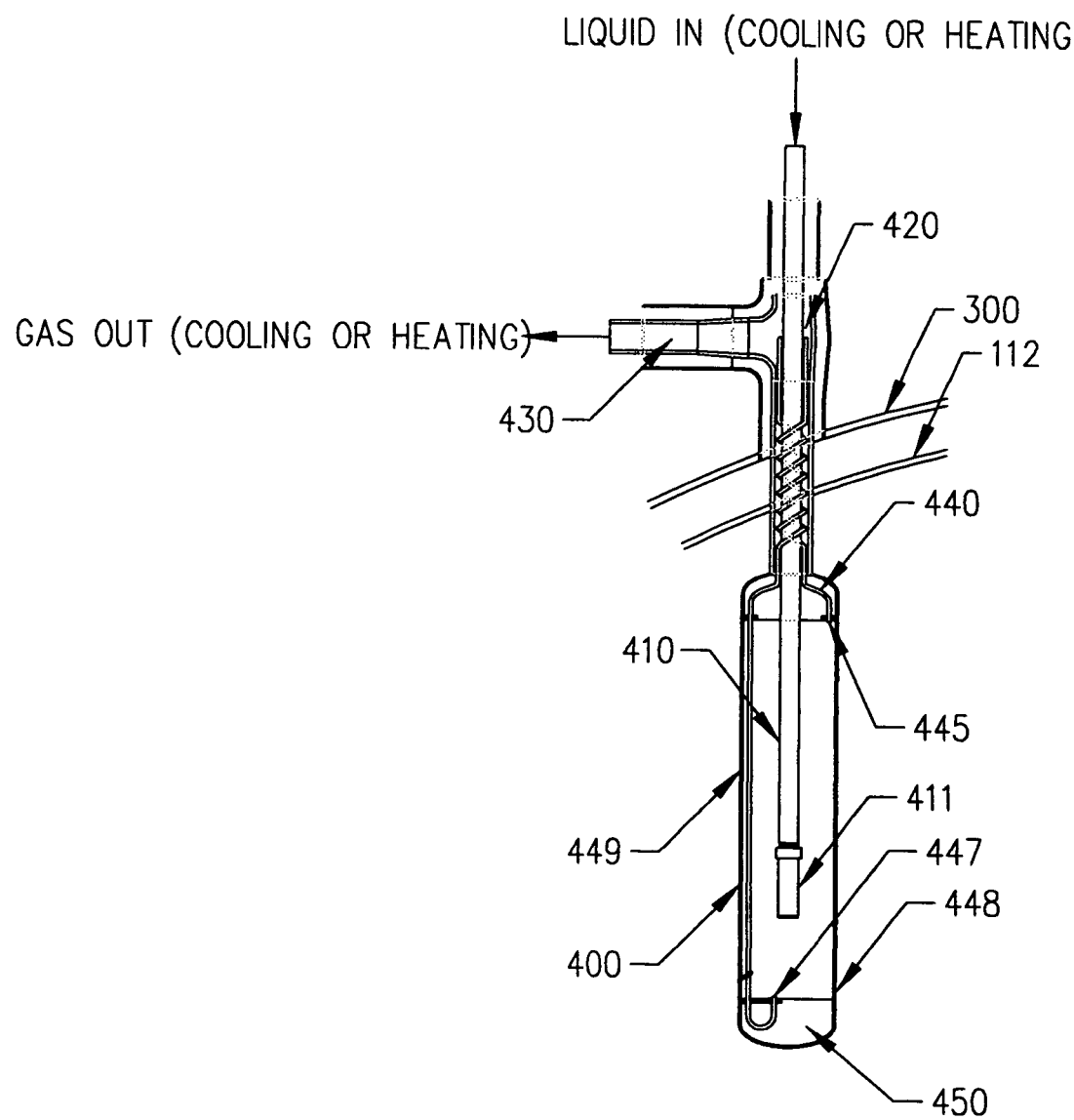
FIG. 5A is a partial cross-sectional view of an isothermal mixing baffle according to the present invention with circular cross-section the isothermal mixing baffle shown entering the reactor vessel from the top.
Figure 6A:
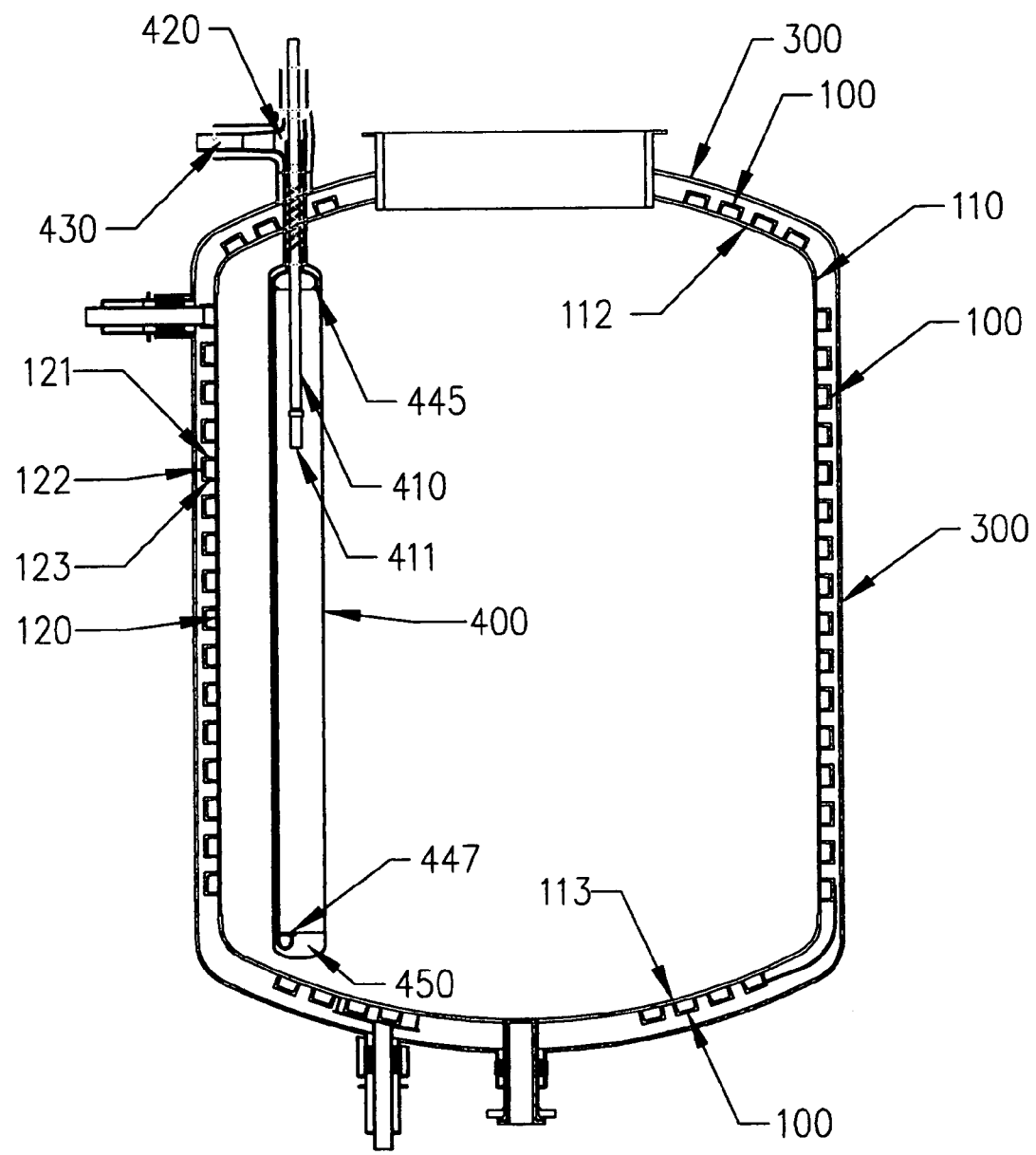
FIG. 6A is a cross-sectional view of the reaction vessel with external channel coil, evacuated jacket, and integral isothermal mixing baffle according to the present invention showing the integral isothermal mixing baffle entering the reactor vessel from the top.

FIG. 5A is a partial cross-sectional view of an isothermal mixing baffle of uniform circular cross-section (a cylinder) in accordance with the present invention. In the exemplary embodiment, an isothermal mixing baffle 400 is used where there exists a need to cool the reaction vessel contents. However, such isothermal mixing baffles can also be used where heating of the contents of the reaction vessel, e.g. reaction vessel 110 of FIG. 4 is needed. The isothermal mixing baffle 400 is inserted into the reaction vessel contents through the top head 112 and evacuated shell 300 as shown in FIG. 6A. For cooling, a saturated or subcooled liquid is introduced into the isothermal mixing baffle 400 through an inlet pipe 410. As previously discussed, the liquid is selected primarily because of its boiling point, providing, of course, other factors do not prevent its use, such as availability, cost, reactivity, toxicity, etc. A liquid having a boiling point lower than that of the reaction vessel contents will boil when heat is absorbed from the reaction vessel contents. Fluids which may be used for cooling or heating in the present invention include, but are not limited to nitrogen, brine, steam, chilled water, carbon dioxide, ammonia, $CF_4$, ethane, ethylene and hot water. Other fluids may also be used depending on the particular needs of the reaction for which the reactor is designed.

The ideal temperature (or range of temperatures) of the reaction vessel contents can be determined from the chemistry of the reaction. This temperature, along with the physical characteristics of the isothermal mixing baffle (dimensions, material of construction, number of baffles, etc.) and relevant heat transfer equations, are combined to give rise to a required amount of heat transfer which must occur across the wall 448 (FIGS. 5A, 5B, 5C, and 5D) of the isothermal mixing baffle 400 in order to maintain the reactor contents at the desired temperature. From this required value of heat transfer, a fluid is selected such that the latent heat of vaporization plus any sensible heat transfer occurring from any rise in temperature of the fluid to its boiling point, will give the desired total heat transfer. It should be noted that a fluid with precisely the right characteristics does not have to exist for accurate control of the temperature. Controlling the flow rate of the fluid into the isothermal mixing baffle 400 or the liquid level thereof will allow for fine tuning the heat transfer and corresponding temperature of the reactor contents. Further, controlling the pressure of the liquid could help alter its boiling point and fine tune the cooling power and range of the liquid. The selected fluid need only fall within a range of necessary heat transfer requirements. Where heating is desired, as shown in FIG. 1B, a hot gas, such as gaseous ammonia, is introduced via line 13 into isothermal mixing baffle 400, the condensed ammonia in line 32 is then combined with other condensed ammonia in line 11 emanating from the phase separator 50 and introduced via line 36 into the channel coil 100. This condensate then heats the contents of reaction vessel 110.

For instance, if a higher rate of cooling is desired, then fluid flow into the isothermal mixing baffle 400 can be increased. This will raise the level of boiling liquid 450 to a level shown as 451 in FIG. 5A in the isothermal mixing baffle 400. This in turn will expose a greater surface area of boiling liquid 450 to wall 448 of isothermal mixing baffle 400, thus allowing greater heat transfer from the reaction vessel contents through wall 448 of baffle 400 into boiling liquid 450.

Alternatively, the isothermal mixing baffles 400 can be used in one of several different heating and cooling schemes. The isothermal mixing baffles 400 may be used to gain only sensible heat, in which case they will serve as sensible energy mixing baffles. The isothermal mixing baffles 400 can also be utilized with a liquid having a boiling point higher than the desired temperature of the reactor contents. Cooling or warming liquid could be passed through the isothermal (or sensible energy) mixing baffles. Additionally, a gas may be passed through the isothermal (or sensible energy) mixing baffles 400. Any fluid that provides the necessary heat transfer properties can be used in the isothermal (or sensible energy) mixing baffles for effective temperature control of the reaction vessel contents. In these cases, the isothermal (or sensible energy) mixing baffles 400 act as simple heat exchangers.

Figure 5B:
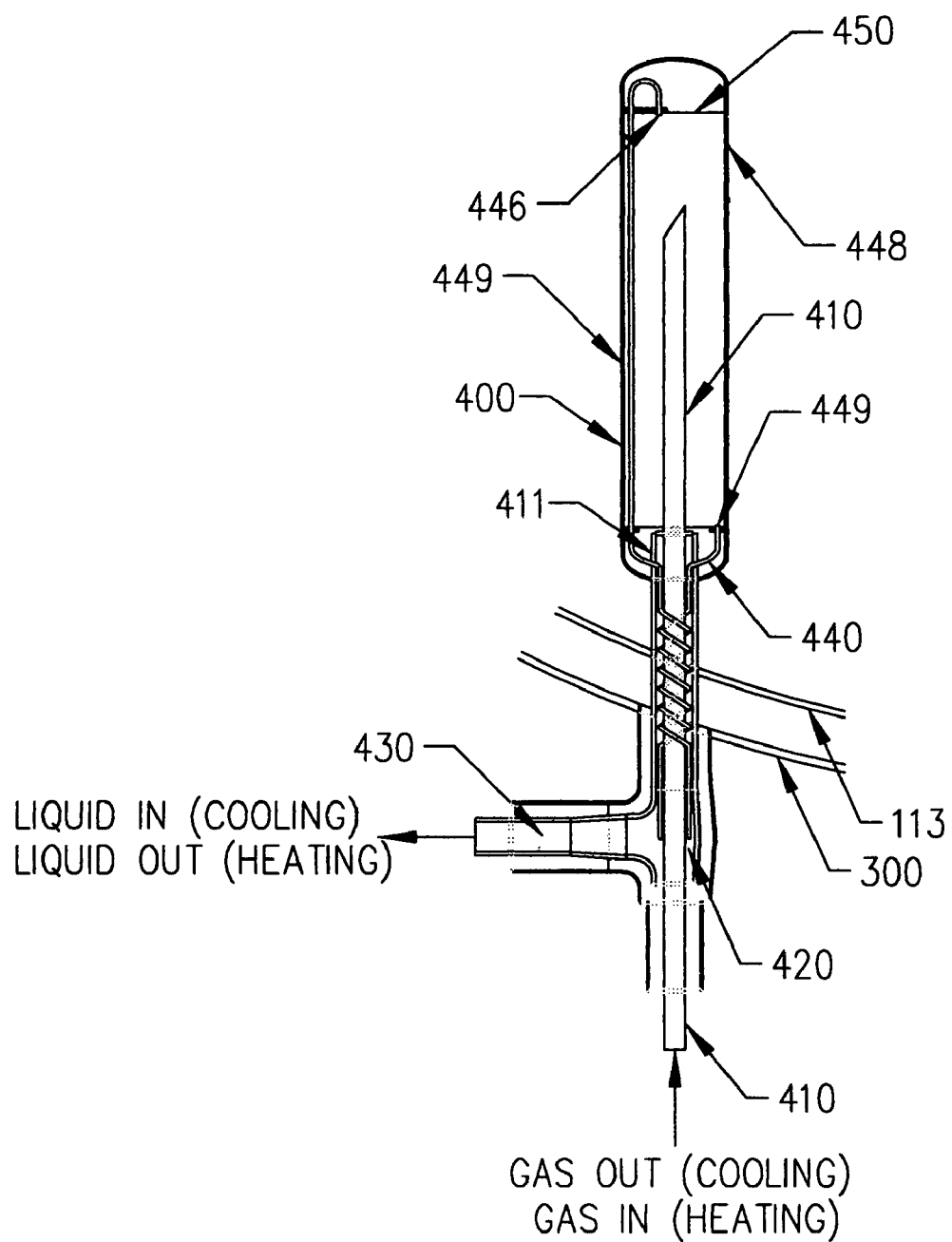
FIG. 5B is a partial cross-sectional view of an isothermal mixing baffle according to the present invention with circular cross-section, the isothermal mixing baffle shown entering the reactor vessel from the bottom.
Figure 6B:
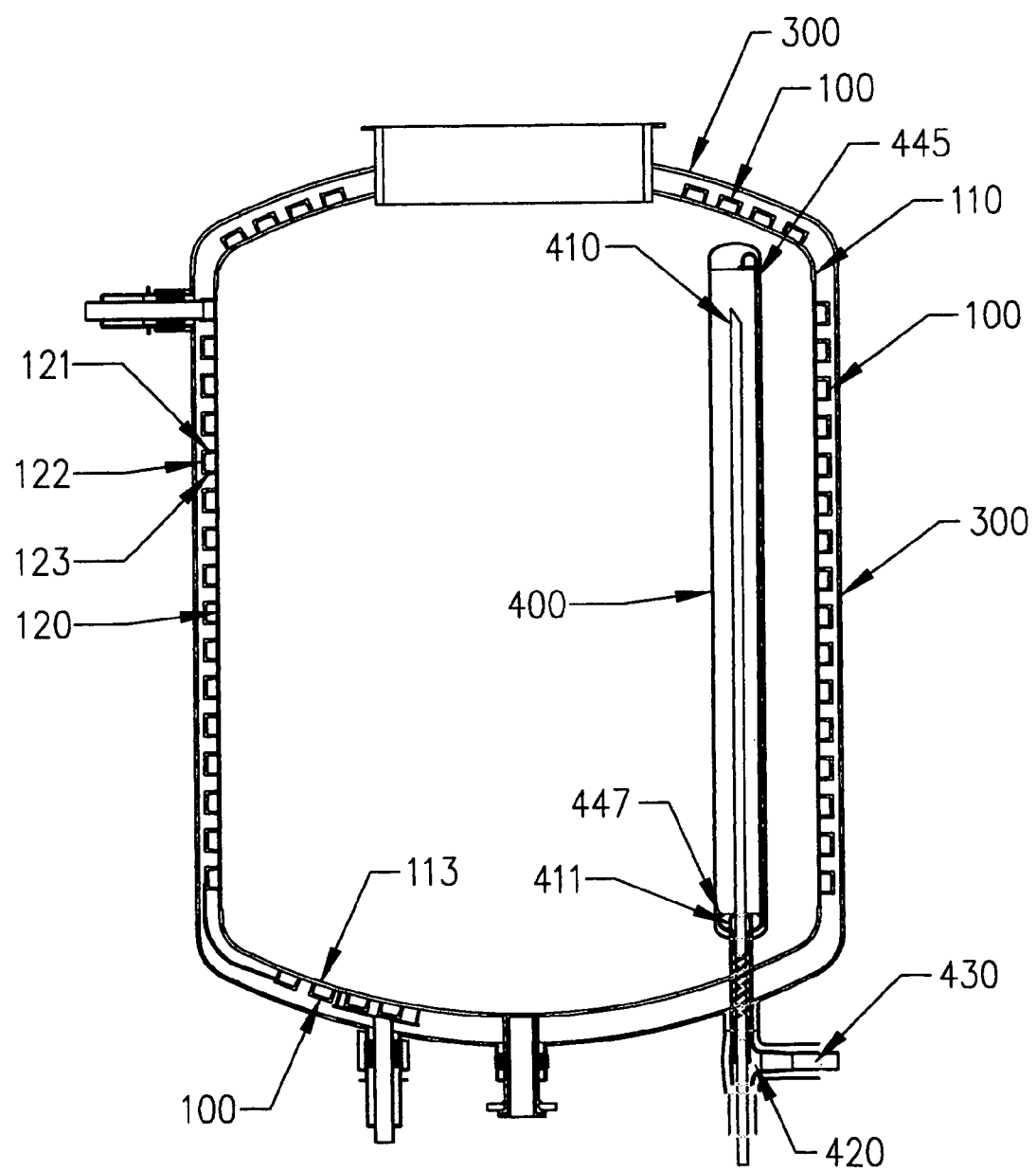
FIG. 6B is a cross-sectional view of the reaction vessel with affixed channel coil, evacuated jacket, and integral isothermal mixing baffle according to the present invention, showing the integral isothermal mixing baffle entering the reactor vessel from the bottom.

Isothermal mixing baffles 400 can be inserted from the top of the reactor, as shown in FIG. 5A and FIG. 6A or from the bottom of the reactor, as shown in FIG. 5B and FIG. 6B. In the preferred embodiment, isothermal mixing baffles 400 have been inserted from the top of the reactor as a matter of convenience and tradition.

In cooling applications, the isothermal mixing baffles 400 are designed and arranged in so that their combined cross-sectional area will be such that the velocity of the vapor evolved from the liquid phase boiling therein will be below a critical value, Uc, above which droplets or slugs of the liquid phase will be entrained in the evolved gas and expelled from the isothermal mixing baffles. As shown in FIGS. 5A, 5B, 5C, and 5D in order to accomplish this requirement, the saturated or sub-cooled inlets 410 and vapor outlets 430 of the isothermal mixing baffles 400 will be piped in parallel. Discrete cooling control can be accomplished by isolating individual isothermal mixing baffles from the plurality of isothermal mixing baffles piped in parallel.

FIG. 5A shows a sintered, porous metal phase separator or "snubber" 411 placed at the end of inlet pipe 410. The snubber 411 curtails the flow of the liquid into or out of the isothermal mixing baffle, just as a kitchen faucet nozzle controls the water flow into a sink, thereby minimizing splashing. Snubber 411 also serves to disengage and allow the phases to separate inside the isothermal mixing baffle.

FIG. 5A and FIG. 5B also show a means for the gas formed from the boiling liquid inside the inside the isothermal mixing baffle 400 to escape. An annular space 420 surrounds the inlet pipe 410. Annular space 420 comprises the same atmosphere as that above the liquid level in the isothermal mixing baffle 400. As liquid flows into the isothermal mixing baffle 400 through inlet pipe 410, resultant vapor or gas is pushed upward and out of the isothermal mixing baffle 400 through exit 430. The exiting gas may then be utilized in various ways. If environmentally safe gas is used, it may be exhausted to the atmosphere by venting it, although this is likely not cost effective. The gas may be recovered by piping it to a condenser, or used at another site where the particular vapor or gas is needed. Finally, the exiting gas may be transported, through vacuum jacketed or otherwise insulated pipe, to the channel coil 100 for further cooling of the reactor contents, as dictated by the preferred embodiment of this invention and depicted in FIG. 1A.

FIG. 5A shows means for detecting the level of liquid in the isothermal mixing baffle 400. A dual leg dip tube 440 is inserted into the isothermal mixing baffle 400. The top opening 445 of the dip tube 440 is near the top of the isothermal mixing baffle 400, and the bottom opening 447 of the dip tube 440 is near the bottom of the isothermal mixing baffle 400. The level of liquid 450 in the isothermal mixing baffle 400 is maintained below the top opening 445 and above the bottom opening 447 of the dip tube. The pressure differential is detected as the pressure of the head of liquid in the dip tube. The pressure at the top opening 445 is the pressure of the gas above the liquid 450. The pressure at the bottom opening 447 is the pressure of the gas above the liquid 450 plus the pressure caused by the weight of the liquid 450 which is above the bottom opening 447. The pressure created by the weight of liquid 450 above the bottom opening 447 can be found by subtracting the value of the pressure at the top opening 445 from the value of the pressure at the bottom opening 447. This pressure can be used (in conjunction with the density of the liquid) to calculate the height of liquid above the bottom opening 447. FIG. 5B shows the mixing baffle 400 inserted through the bottom of the reactor vessel. In this instance the top opening is 446 and the bottom opening 449 of dip tube 440.

Figure 5C:
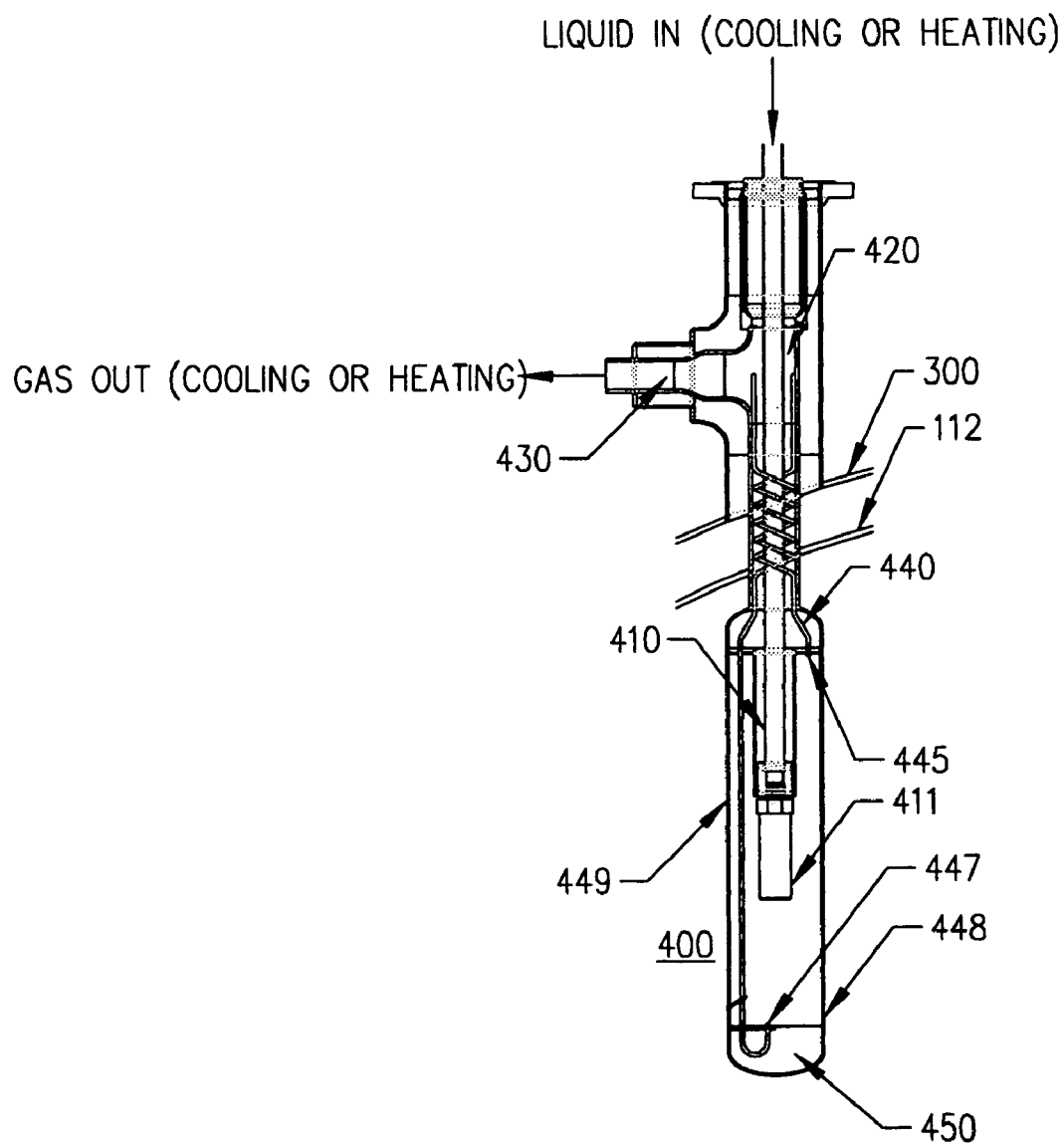
FIG. 5C is an alternate embodiment of the device of FIG. 5A showing the use of an internal snubber made to be removable from outside the reactor vessel without disturbing the reactor vessel contents or evacuated shell.
Figure 5D:
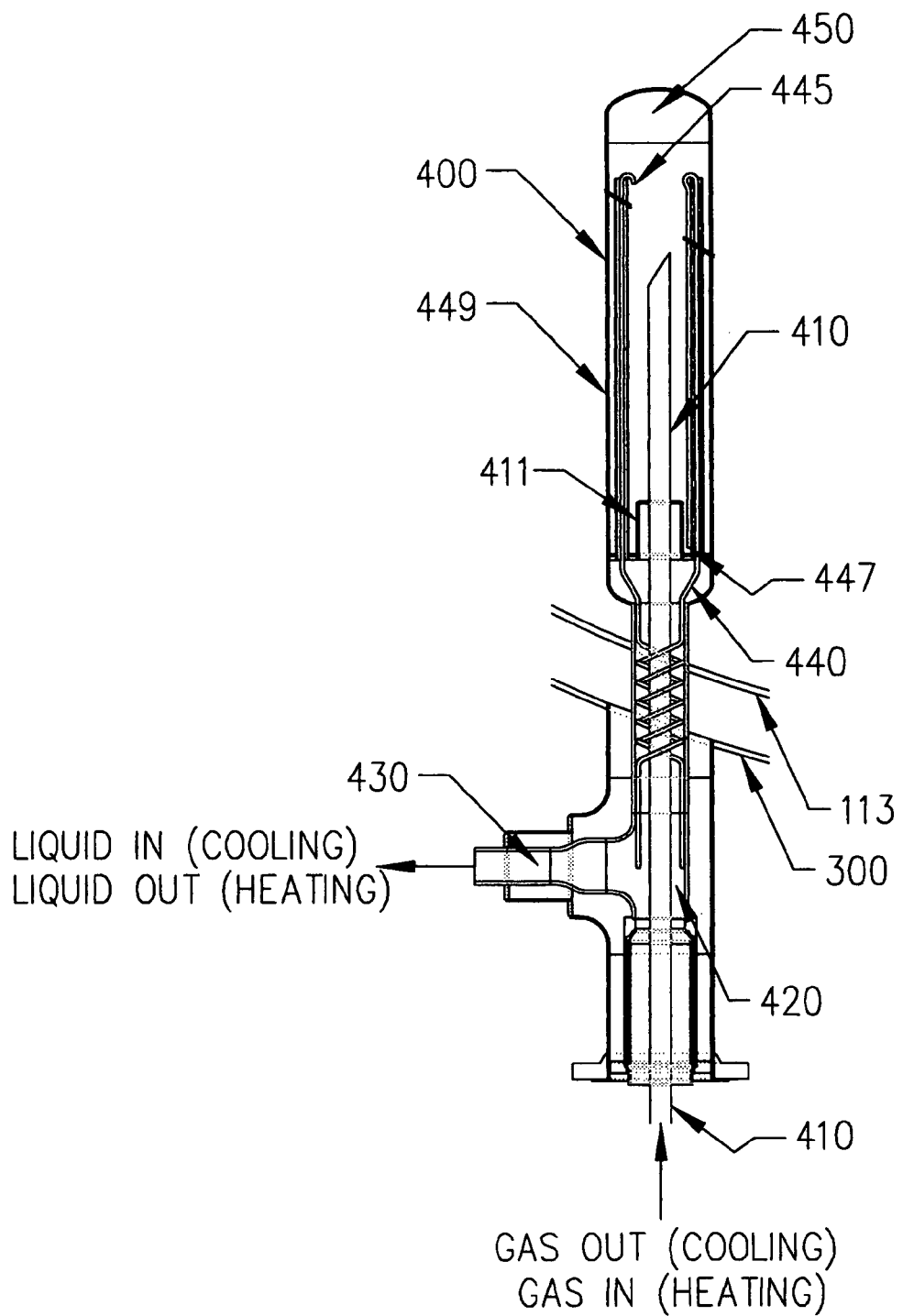
FIG. 5D is an alternate embodiment of the device of FIG. 5B showing the use of an internal snubber made to be removable from outside the reactor vessel without distributing the reactor vessel contents or evacuated skill.

FIGS. 5C and 5D are alternative embodiments of FIGS. 5A and 5B, respectively, wherein the internal sintered, porous metal phase separator or "snubber" 411 is made to be removable from outside the reactor vessel, without disturbing the reactor vessel contents or evacuated shell 300.

Figure 5E:
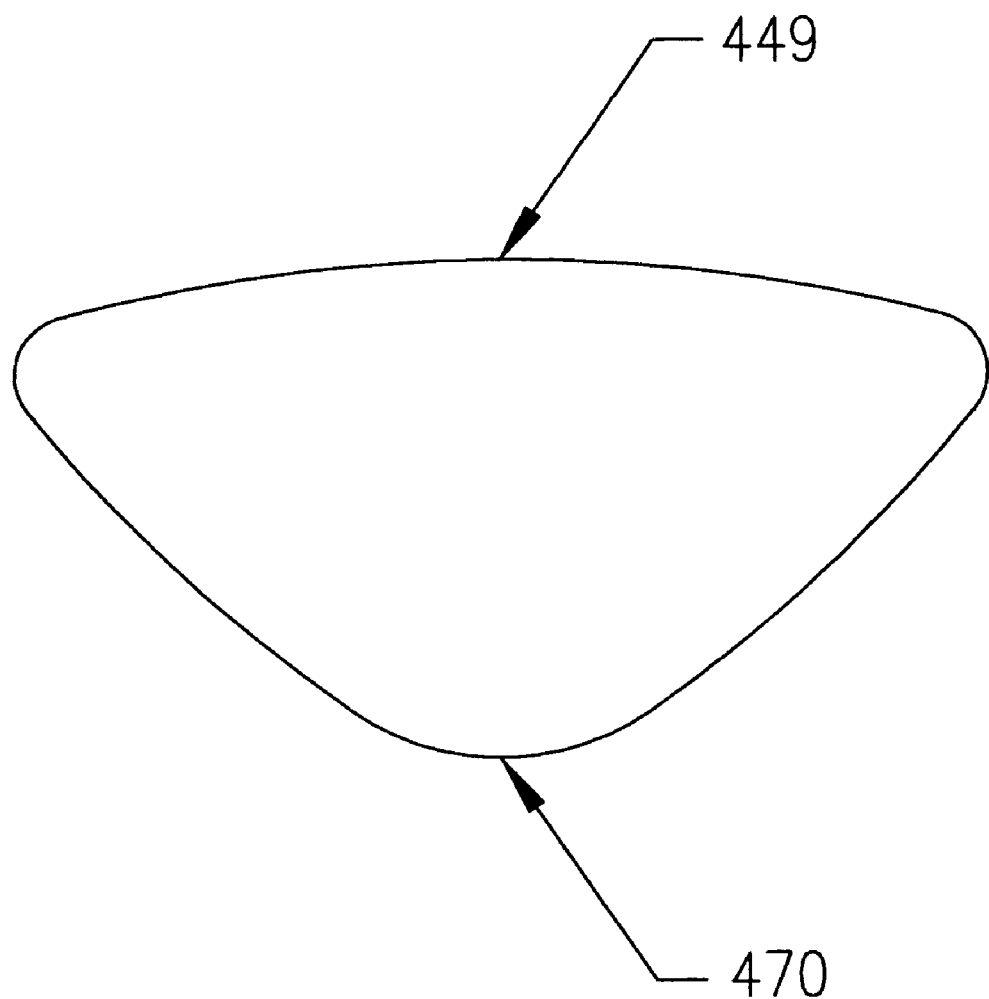
FIG. 5E is a horizontal cross-sectional view of an alternate embodiment of the cross-sectional shape of the device of FIG. 5A.
Figure 5F:
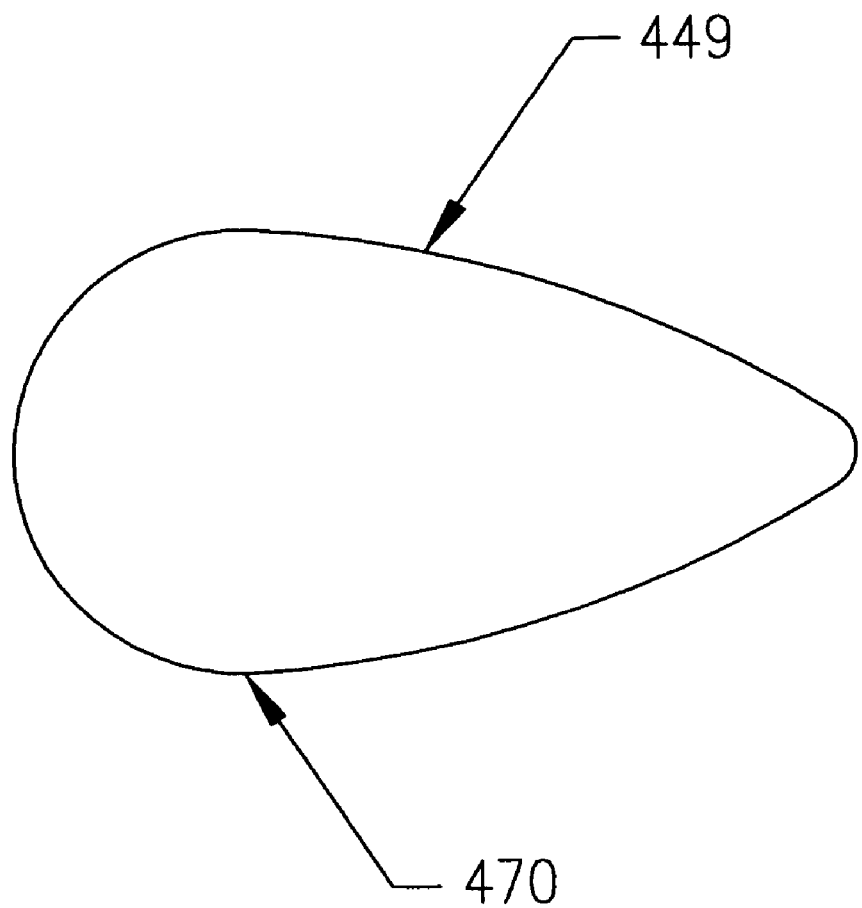
FIG. 5F is a horizontal cross-sectional view of an alternate embodiment of the cross-sectional shape of the device of FIG. 5B.

FIGS. 5E and 5F are alternative embodiments 470 of the isothermal mixing baffles 400 which employ non-circular cross-sectional geometries, such as ellipsoids and airfoils 448. These alternative embodiments may be prescribed to augment surface area and/or direct the flow of reactor contents to enhance mixing.

FIG. 6A shows the present invention including reaction vessel 110, channel coil 100, and one isothermal mixing baffle 400 inserted from the top of the reactor, which penetrates the upper head 112 and evacuated shell 300. It would be apparent to one of ordinary skill in the art that multiple isothermal mixing baffles 400 could be used to increase the overall rate of heat transfer between the reactor contents and isothermal mixing baffle contents. An additional advantage to utilizing multiple isothermal mixing baffles 400 is seen where the reactor contents are agitated with a mixing blade apparatus.

Figure 7A:
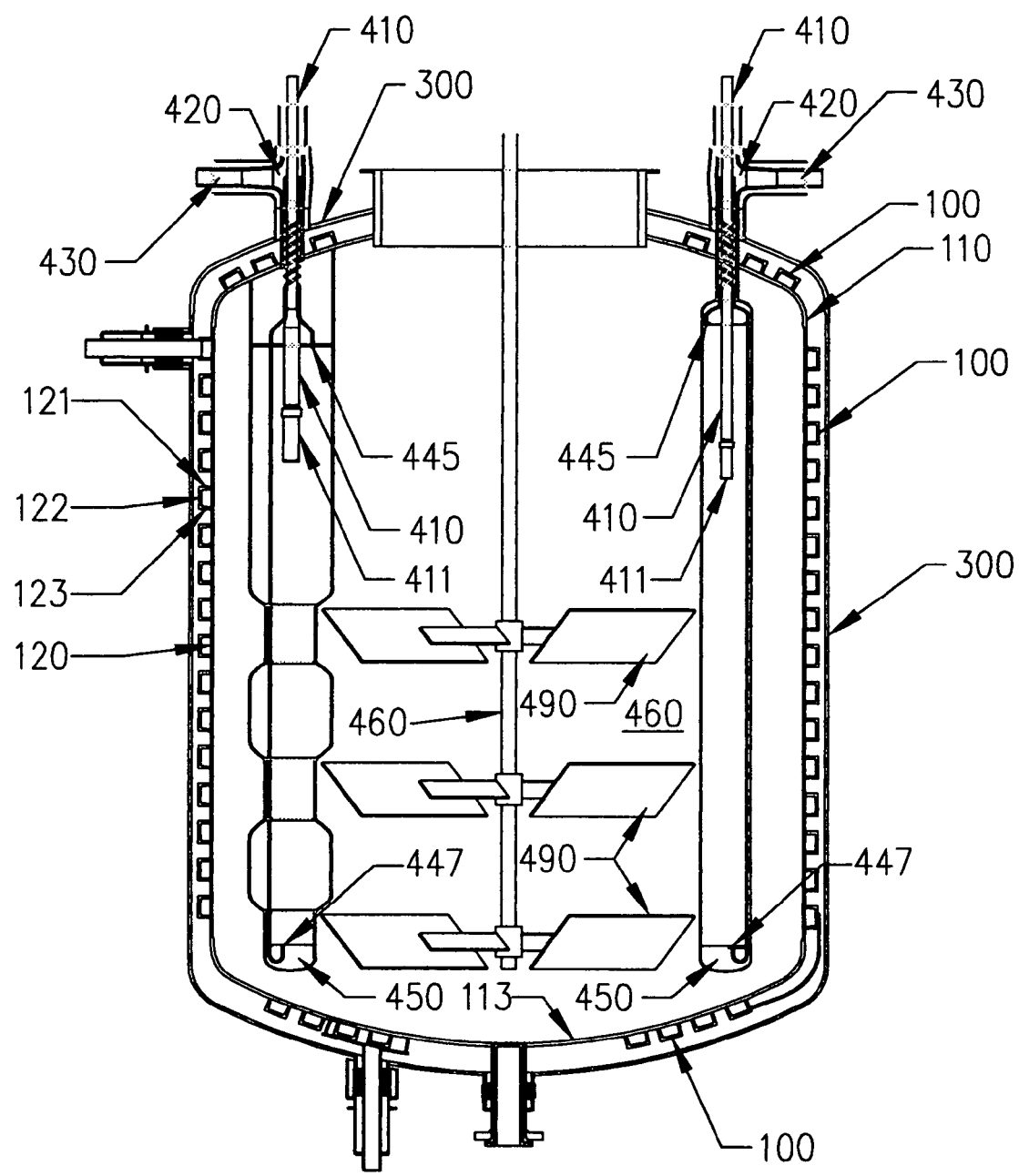
FIG. 7A is a partial cross-sectional view of the reaction vessel with external channel coil, evacuated jacket, two isothermal mixing baffles, and a mixing apparatus, according to the present invention, with the integral isothermal mixing baffles entering the reactor vessel from the top.

FIG. 7A shows an embodiment where multiple isothermal mixing baffles 400 are used in conjunction with an agitator 460. In such a case, the isothermal mixing baffles 400 must be arranged outside the radius of mixing blades 490 of agitator 460. In such a configuration, the isothermal mixing baffles 400 also act as mixing baffles, thus our use of the term isothermal mixing baffles.

Figure 7B:
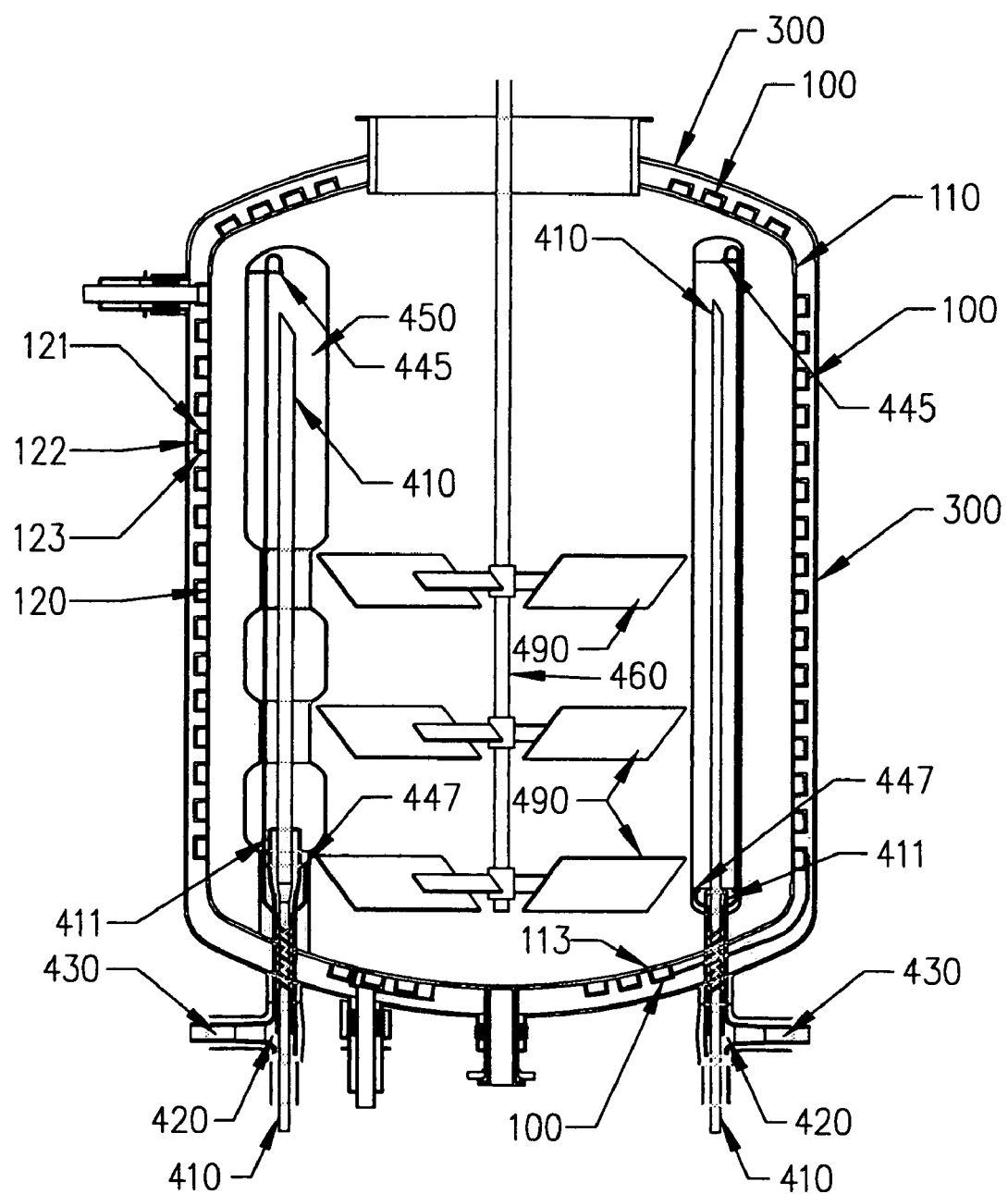
FIG. 7B is a partial cross-sectional view of the reaction vessel with affixed channel coil, evacuated jacket, two isothermal mixing baffles, and a mixing apparatus, according to the present invention, with the integral isothermal mixing baffles entering the reactor vessel from the bottom.

FIG. 6B shows an alternative embodiment of the present invention including reaction vessel 110, channel coil 100, and one isothermal mixing baffle 400 inserted from the bottom of the reactor, which penetrates the lower head 113 and evacuated shell 300.

Where the reactor is agitated as shown in FIG. 7A and FIG. 7B, formation of frozen reactor contents on the outside surface of the isothermal mixing baffle 400 is prevented by placing the isothermal mixing baffle 400 in or near the streamlines corresponding to maximum free stream velocity. By placing the isothermal mixing baffle 400 in these high velocity streamlines, turbulent flow around the isothermal mixing baffle 400 is maximized. By maximizing turbulent flow immediately adjacent to the isothermal mixing baffle 400, the thickness of the laminar thin film at the surface of the isothermal mixing baffle 400 is minimized. Minimizing the thickness of this film is important in preventing material from solidifying on the surface of the isothermal mixing baffle 400. Formation of ice on the surface of the isothermal mixing baffles 400 is detrimental as the temperature of the ice will be at the freezing point of the reactor content fluids, not the much lower boiling liquid 450 inside the isothermal mixing baffles 400.

The correlation between high turbulence and avoidance of ice (or solid) formation is due to the fact that heat transfer through a laminar layer is largely conduction controlled, but heat transfer through a turbulent fluid is largely convection controlled. Convective heat transfer takes place because a fluid is in motion and eddies within the fluid effectively carry heat throughout the fluid. This is very efficient heat transfer. Conductive heat transfer, however, is due to interaction (molecular) between the molecules comprising the medium through which the heat passes. This type of heat transfer is much less efficient than convective heat transfer. Where heat transfer is convection controlled, it occurs much more quickly than for the same fluid, not moving, where conduction is the only source of heat transfer. Moreover, when a fluid has turbulent flow characteristics, heat transfer is much quicker than where the same fluid is not moving (and other pertinent factors are the same). So where the laminar, non-moving, fluid film thickness is minimized, more heat is transferred through it in a given time period and the formation of ice is subsequently slowed or prevented. Where the laminar layer is thick, heat transfer is limited, and the layer freezes more quickly than where the layer is thinner. The above mentioned probe placement provides for an overall heat transfer coefficient that is largely convection-controlled, corresponding to fully developed turbulent flow. This maximizes overall heat transfer and prevents formation and build-up of frozen reactor contents on the probe surface. A further requirement to prevent the formation of ice on the external surface of the isothermal mixing baffles 400 is that the convective film heat transfer coefficient, on the outside of the isothermal mixing baffles 400 (in contact with the reactor contents), be greater than the convective film heat transfer coefficient on the inside of the isothermal mixing baffles 400 (in contact with the boiling liquid 450). This outcome can be achieved through a programmable control device available through Arencibia Associates Inc., Center Valley, Pa.

FIGS. 7A and 7B show alternative embodiments of the isothermal mixing baffles 400, wherein the cross-sectional area of the isothermal mixing baffles is increased at axial locations where there will not be interference with reaction blades 490 of agitator 460. This alternative embodiment results in increased heat transfer area.

FIGS. 8A and 8B show additional embodiments of the cross-sectional shape of channel coil 100. The outside walls 121, 123 of the channel coil 100 may be of nearly any shape. It is critical, however, that the portion of outside walls 121, 123 adjacent wall 120 of vessel 110 shown as walls 701, 702 (FIG. 8A) and 703, 704 (FIG. 8B) are both normal to the outside reaction vessel wall 120. In this configuration, channel coil 100 supports and strengthens reaction vessel wall 120, allowing use of a thinner wall and greater heat transfer.

Figure 8D:
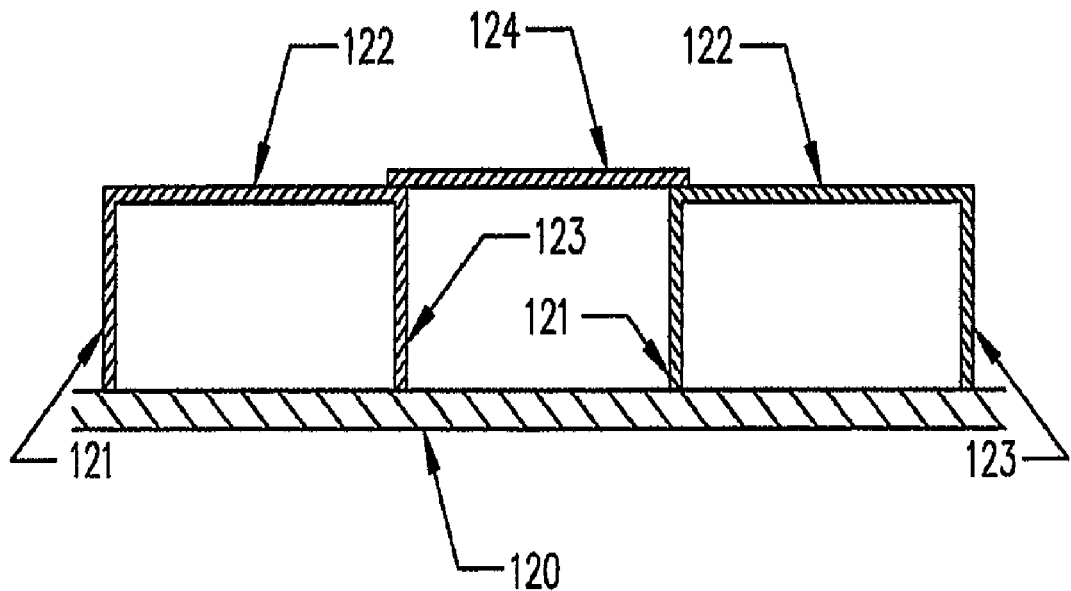
FIG. 8D is a fragmentary cross-sectional view of another alternate embodiment of the channel coil wherein the full reaction vessel wall can be exposed to the fluid in the channel coil.

FIG. 8D shows a particular embodiment wherein the cross-sectional area of channel coil 100 available for flow of heat transfer working fluid can be increased by joining adjacent coils with wall 124, which may be flat, as shown, or nearly any shape. If flat, like wall 122, wall 124 will also ad strength to the reaction vessel and further allow for the reduction of the thickness of the reaction vessel wall 120, if external pressure is controlling. The channel defined by wall 124 and adjacent walls of the helical channel coil can be used to introduce additional fluid to contact wall 120 to thus further improve the heat transfer. The fluid in this channel can be different than the fluid in the helical channel coil.

Figure 9A:
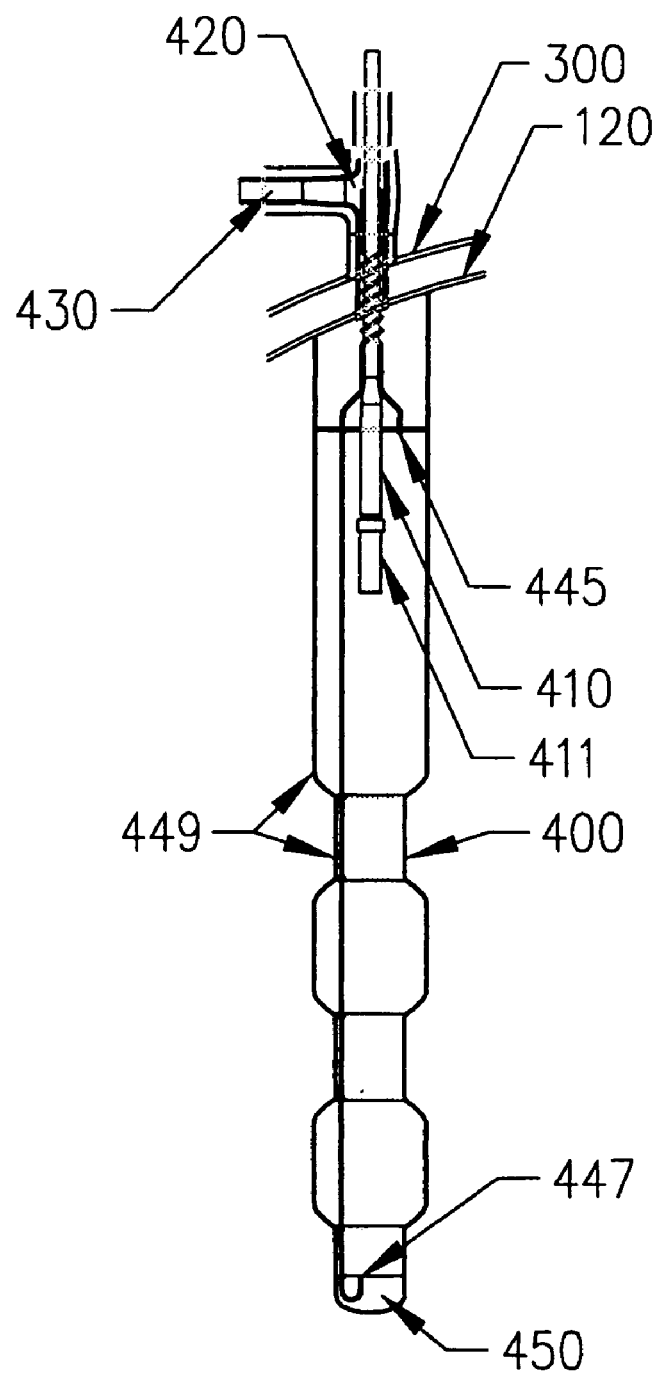
FIG. 9A is a partial cross-sectional view of an alternate embodiment of the isothermal mixing baffle of the present invention.
Figure 9B:
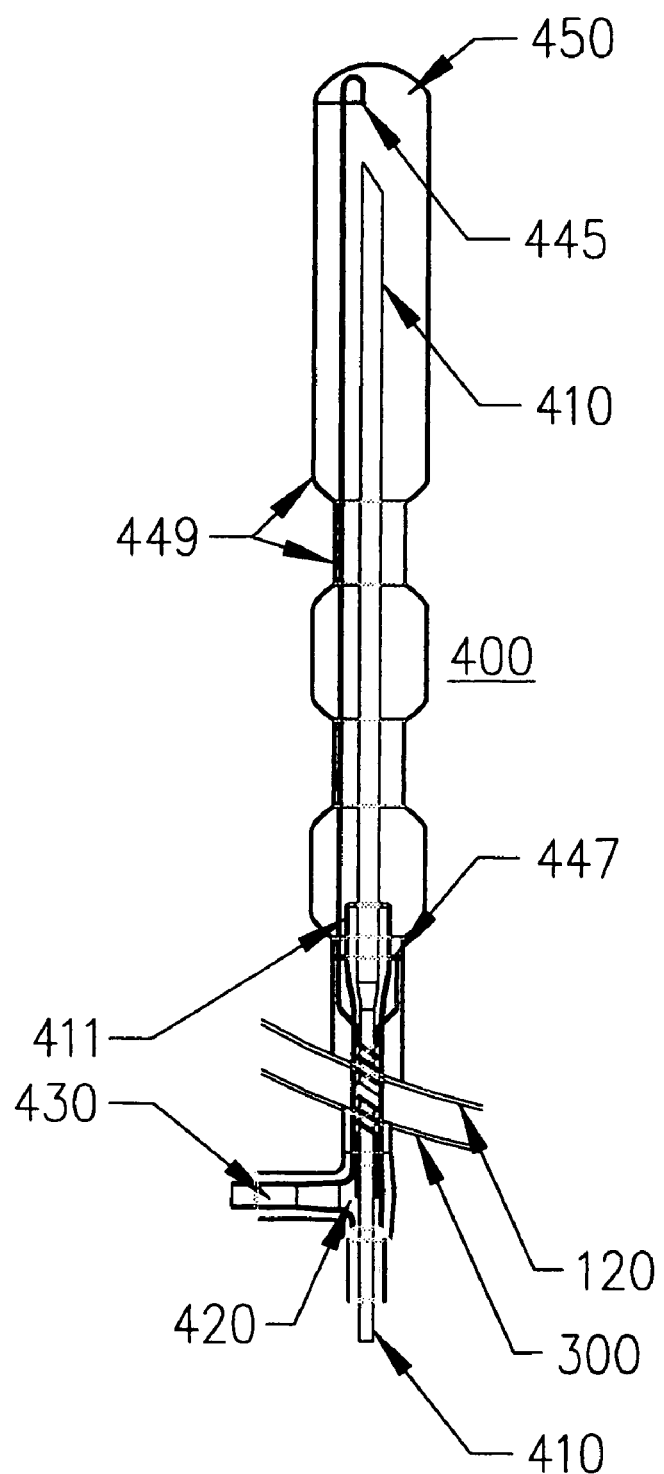
FIG. 9B is a partial cross-sectional view of another embodiment of the isothermal mixing baffle of the present invention.

FIGS. 9A and 9B are alternative embodiments of FIGS. 5A and 5B, respectively, wherein the wall 449*a* comprises cylindrical sections of different diameters so that the smaller diameter accommodates the trajectory of agitator blades and the larger diameter allows for greater heat transfer area.

Figure 10:
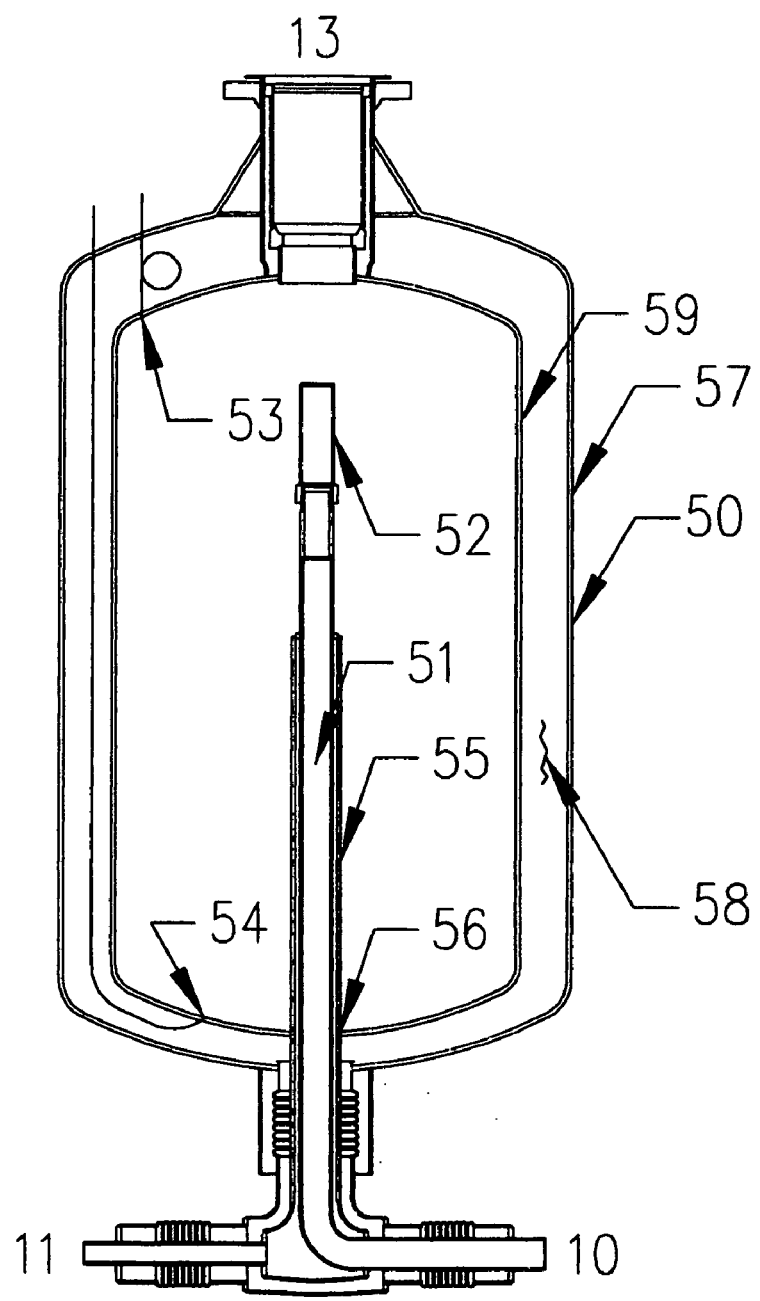
FIG. 10 is a cross-sectional view of a preferred embodiment of the phase separator of the present invention for use in cooling or heating according to the present invention.

FIG. 10 is a cross-sectional view of a preferred embodiment of phase separator 50 having an internal vessel 57 and an evacuated shell 59 of the present invention for use in a cooling or heating mode application. The evacuated shell 59 completely encloses internal vessel 57, with the exception of related piping and utilities, which penetrate the evacuated shell 59. The placement of the evacuated shell 59 around the apparatus as described above allows for additional insulation of internal vessel from the ambient air. Insulation from the ambient air results in decreased heat transfer through the internal vessel 57, as some of the energy is parasitically lost outwardly to the environment through the insulation 58. The utilization of evacuated shell 59 results in greater temperature control of the reaction vessel contents, making the insulation 58 more thermally efficient. The evacuated shell 59 may be constructed from any suitable material, including carbon steel, stainless steel, Inconel, or Hastelloy C. Further, evacuated shell 59 can also include reflective material on the inner or outer surface thereof to reduce radiant heat transfer.

Working heat transfer fluid which may be sub-cooled, saturated or contain both phases enters the phase separator at the inlet nozzle 10 and is ducted vertically through an internal coaxial pipe 51 to a porous membrane diffuser 52 through which it enters the internal phase separator vessel 57.

In order for the liquid and vapor phases of the working heat transfer fluid to separate by gravity, the cross-sectional area of the internal vessel 57 of phase separator 50 will be such that the velocity of the vapor separated from the liquid phase entrained therein will be below a critical value, Uc, above which droplets or slugs of the liquid phase will be entrained in the evolved gas and expelled from the phase separator.

The liquid phase of the working heat transfer fluid enters the annulus between the external coaxial pipe 55 and the internal coaxial pipe 51 through apertures 56 on the external coaxial pipe 55 located at the lower end of the internal vessel 57. The liquid phase of the working heat transfer fluid then exits the phase separator at the outlet liquid nozzle 11. The vapor phase of the working heat transfer fluid then exits the phase separator at the outlet vapor nozzle 13.

Figure 11:
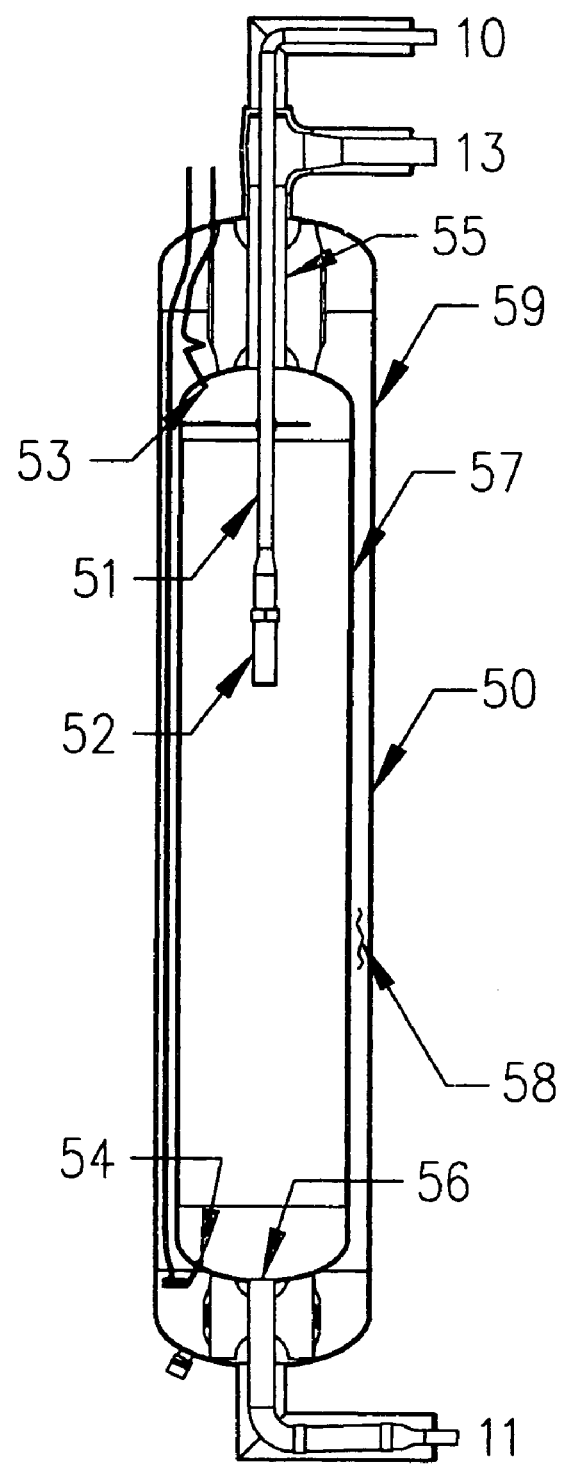
FIG. 11 is a partial cross-sectional view of an alternative embodiment of the phase separator of the present invention for use in cooling or heating according to the present invention.

FIG. 11 is a cross-sectional view of alternate embodiment of the phase separator of the present invention for use in a cooling or heating mode application. In this alternative embodiment the working heat transfer fluid inlet nozzle is located on top along with the outlet vapor nozzle 13. The outlet liquid nozzle 11 is located in the bottom.

Upper sensing line 53 in FIG. 10 and FIG. 11 and lower sensing line 54 in FIG. 10 and FIG. 11 detect liquid inventory of working heat transfer fluid in the phase separator 50, by the same mechanism described for determining liquid level in the isothermal mixing baffles 400, in connection with FIG. 5A. Upper sensing line 53 in FIG. 10 and FIG. 11 is analogous to 445 in FIG. 5A. Lower sensing line 54 in FIG. 10 and FIG. 11 is analogous to 447 in FIG. 5A.

Although the present invention has been described with reference to exemplary embodiments, it is not limited thereto. Rather, the appended claims should be construed to include other variants and embodiments of the invention, which may be made by those of ordinary skill in the art without departing from the true spirit and scope of the present invention.

What is claimed:

1. An insulated chemical reactor comprising:
   a reaction vessel having a wall with inner and outer surfaces;
   an evacuated insulation shell spaced apart from and surrounding said reaction vessel;
   at least one isothermal mixing baffle disposed within said reaction vessel;
   a phase separator in fluid communication with said baffle so that only one saturated or sub-cooled liquid phase of a heat transfer working fluid enters said isothermal mixing baffle;
   a temperature controlling helical channel coil fixed to said outer surface of said wall of said reaction vessel, said helical channel coil having at least two flat parallel walls disposed normal to and in contact with the outer surface of said wall of said vessel, thus defining an open helical channel coil fixed to said wall of said vessel, said helical channel coil having a winding pitch so that successive coils of said channel coil are spaced apart from each other, thus defining a closed path to receive a fluid to contact said wall of said reaction vessel, said wall of said reaction vessel being of a thickness less than that required for use under a given temperature and pressure regime, said channel coil serving to add structural strength to said wall of said reaction vessel, so that said reaction vessel with said channel coil fixed thereto can be operated under said temperature and pressure regime; said helical channel coil fixed to said outer surface to enhance conductive heat transfer and transfer of convective energy flow inside said helical channel coil through said wall of said vessel; and
   means to combine vapor from said phase separator and vapor from said isothermal mixing baffle and introduce said vapor into said helical channel coil.

2. A reactor as claimed in claim 1, wherein said temperature controlling helical channel coil comprises a generally rectangular shaped channel fixed to said outer surface of said reaction vessel, said channel coil and said wall of said reaction vessel defining a closed fluid flow passage.

3. A reactor as claimed in claim 1, further including insulating material covering an outside surface of said helical channel coil.

4. A reactor as claimed in claim 1, wherein said heat transfer working fluid is selected from the group consisting of nitrogen, helium, brine, steam, chilled water, carbon dioxide, ammonia, CF4, methanol, ethanol, ethane, ethylene, methane, R134A and hot water.

* * * * *

UNITED STATES PATENT AND TRADEMARK OFFICE
CERTIFICATE OF CORRECTION

| | | |
|---|---|---|
| PATENT NO. | : 6,955,793 B1 | Page 1 of 2 |
| APPLICATION NO. | : 09/548511 | |
| DATED | : October 18, 2005 | |
| INVENTOR(S) | : Jose P. Arencibia, Jr. | |

It is certified that error appears in the above-identified patent and that said Letters Patent is hereby corrected as shown below:

In the Drawings

Please include Fig. 8D

Please delete Fig. 8D and replace with Fig. 8D

Signed and Sealed this

Twenty-fourth Day of April, 2007

JON W. DUDAS
*Director of the United States Patent and Trademark Office*